(12) United States Patent
Chang et al.

(10) Patent No.: US 6,961,326 B1
(45) Date of Patent: Nov. 1, 2005

(54) APPARATUS AND METHOD FOR TRANSMITTING VARIABLE-LENGTH DATA ACCORDING TO A RADIO LINK PROTOCOL IN A MOBILE COMMUNICATION SYSTEM

(75) Inventors: Hoon Chang, Seoul (KR); Hyun-Seok Lee, Songnam-shi (KR); Dae-Gyun Kim, Seoul (KR); Chang-Hoi Koo, Songnam-shi (KR)

(73) Assignee: Samsung Electronics Co., Ltd, (KR)

( * ) Notice: Subject to any disclaimer, the term of this patent is extended or adjusted under 35 U.S.C. 154(b) by 691 days.

(21) Appl. No.: 09/580,683

(22) Filed: May 30, 2000

(30) Foreign Application Priority Data

May 27, 1999 (KR) ............................... 1999-20081

(51) Int. Cl.[7] ...................... H04Q 7/24; H04B 7/216; H04J 3/24

(52) U.S. Cl. ...................... 370/338; 370/252; 370/342; 370/474

(58) Field of Search ............................... 370/335, 342, 370/466, 474, 328, 338, 428–429, 394, 252; 714/746–751; 709/232; 710/305

(56) References Cited

U.S. PATENT DOCUMENTS

| 5,546,549 A | * | 8/1996 | Barrett et al. ............... 710/305 |
| 5,805,822 A | * | 9/1998 | Long et al. .................. 709/232 |
| 6,226,301 B1 | * | 5/2001 | Cheng et al. ............... 370/474 |
| 6,353,907 B1 | * | 3/2002 | van Nobelen ............... 714/746 |
| 6,542,490 B1 | * | 4/2003 | Ahmadvand et al. ....... 370/338 |

FOREIGN PATENT DOCUMENTS

WO          WO 99/04521        *  1/1999

* cited by examiner

*Primary Examiner*—Steven Nguyen
(74) *Attorney, Agent, or Firm*—Dilworth & Barrese LLP

(57) ABSTRACT

A method for transmitting data in a mobile communication system. The method comprising segmenting a data stream into at least one consecutive frame having a variable data length, the data stream being segmented into a plurality of consecutive blocks having a variable data length, each said consecutive block being segmented into a plurality of sub-consecutive blocks having a byte length; attaching, at each head of the consecutive frames, a header including a first set of bits indicating the sequence number of a consecutive block corresponding to the head and a second set of bits indicating the sequence number of a sub-consecutive block corresponding to the head; and transmitting the header-attached consecutive frames.

7 Claims, 14 Drawing Sheets

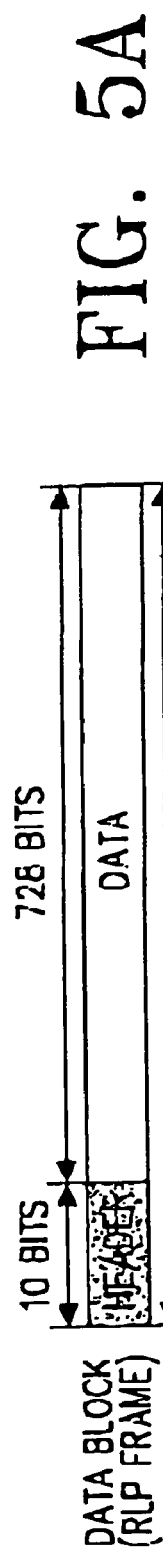
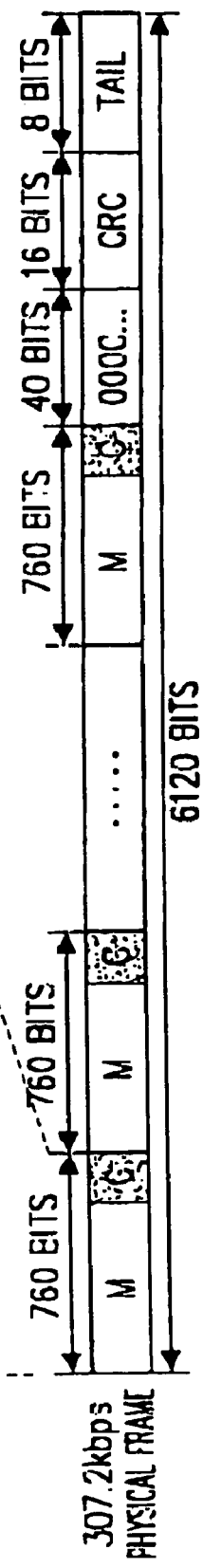
FIG. 5A
FIG. 5B
FIG. 5C
FIG. 5D

APPARATUS AND METHOD FOR TRANSMITTING VARIABLE-LENGTH DATA ACCORDING TO A RADIO LINK PROTOCOL IN A MOBILE COMMUNICATION SYSTEM

PRIORITY

This application claims priority to an application entitled "Apparatus and Method for Exchanging Variable-Length Data according to Radio Link Protocol in Mobile Communication System" filed in the Korean Industrial Property Office on May 27, 1999 and assigned Serial No. 99-20081, the contents of which are hereby incorporated by reference.

BACKGROUND OF THE INVENTION

1. Field of the Invention

The present invention relates generally to a CDMA (Code Division Multiple Access) mobile communication system, and in particular, to a device and method for transmitting data according to a radio link protocol (RLP) used for effective data transmission in radio environments.

2. Description of the Related Art

In general, CDMA mobile communication systems have developed from the IS-95 standard, which mainly provides voice service, into the CDMA-2000 standard, which provides high-speed data service as well as voice service. The CDMA-2000 standard can provide high-quality voice service, moving picture service and Internet search service.

FIG. 1 shows an exemplary packet data service defined by the CDMA-2000 standard. In FIG. 1, a mobile station (MS) includes a terminal equipment (TE) and a mobile termination (MT). A base station is represented by BS/MSC (Base Station/Mobile Switching Center), and an interworking function block (IWF) connects the BS/MSC to a data network (e.g., Internet). The IWF block is a device for converting between different protocols, when different protocols are used. In FIG. 1, the upper layer service (or Web service) processors of the mobile station and the IWF block form messages which are passed down through a network protocol (e.g., Internet protocol (IP)) processor and a link protocol (e.g., point-to-point protocol (PPP)) processor. Then, the data assembled by the upper layer service processors is finally transmitted to the lower layers in the form of a link protocol packet, and the lower layers transmit the data using a proper protocol (e.g., EIA-232, RLP, etc).

FIG. 1 shows an example where an EIA-232 controller is used between the TE and the MT. Generated RLP frames are transmitted over a physical channel connected according to the IS-2000 standard, which is part of the CDMA-2000 standard. The RLP packets received at the base station over the connected physical channel are restored back to link protocol packets and the restored packets are transmitted to the IWF block through the relay layer. In general, interfacing between the base station and the IWF block is performed according to the IS-658 standard. In the IWF block, the link protocol layer reads data from the link protocol packets and transmits the data to the network protocol processor, where the data is finally transmitted to the upper service processor. The distribution of link protocol packets into radio link protocol (RLP) frames through the RLP is one of the subjects of the present invention.

Above, a description has been made of a process for transmitting data from the mobile station to the base station, and it should be noted that the process for transmitting the data from the base station to the mobile station can be performed in a similar manner. To provide various services, the CDMA-2000 standard supports various schemes different from that of FIG. 1. However, the various schemes have a common feature in that the link protocol packets with the upper service data are transmitted over the physical radio channel through the RLP.

The RLP Type-3 specification generates only the RLP frame having a proper size to fill either a physical channel frame of 9.6 Kbsp or 19.2 Kbps for the current Rate Set 1, or the RLP frame having a proper size to fill either a physical channel frame of 14.4 Kbps or 28.8 Kbps for the Rate Set 2. Therefore, when the physical channel operates at the higher rate of 153.6 Kbps or 230.4 Kbsp, a method is used for filling several RLP frames in one physical channel frame. If the physical channel supports a rate over 153.6 or 230.4 Kbps (which is the maximum rate supported in the RLP Type-3 specification), for example, if the physical channel supports the rates of 307.2 Kbps, 460.8 Kbps, 614.4 Kbps and 1036.8 Kbps, more RLP frames can be filled in one physical channel frame. However, as compared with the method for filling one physical channel with one large-sized RLP frame, this method causes an increasing burden on the frame header and creates unusable parts of the frame, thereby decreasing the frame efficiency. Therefore, to transmit a RLP frame with a size larger than the current RLP Type-3 frame, a new method is required.

An important operation performed by the RLP Type-3 is to create and analyze a segmented frame. That is, when a size of the retransmission frame to be transmitted is larger than a size of the data block which can be transmitted, the RLP segments a data portion (or portion) of the retransmission frame to be transmitted into several segmented frames. The RLP Type-3 specification performs the segmentation procedure as follows.

First, the RLP Type-3 can create a maximum of 3 segments. The respective segments are distinguishable with three values of FIRST, SECOND and LAST. When more than 3 segments are required, the RLP Type-3 does not transmit the retransmission frame until it is possible to transmit the retransmission frame with three segmented frames.

Second, a reassembly procedure for the segmented frames is performed only after all of the segments are received. That is, if any one of the FIRST, SECOND and LAST segmented frames is not received, it is necessary to retransmit all the segments.

The RLP Type-3 specification creates an RLP frame of a size which is filled in the physical channel frame of 9.6 Kbps or 19.2 Kbps at the Rate Set 1, and an RLP frame of a size which is filled in the physical channel frame of 14.4 Kbps or 28.8 Kbps at the Rate Set 2, so that it is possible to transmit a maximum of 3 segments even at the 9.6 Kbps or 14.4 Kbps, which is the lowest transmission rate. However, when the physical channel uses the larger RLP frame to increase transmission efficiency at the higher transmission rate, a new segmentation method is required which is different from the existing segmentation method.

SUMMARY OF THE INVENTION

An object of the present invention is to create an RLP frame of various length and to transmit the increased amount of data by using a sequence number in a block unit and a sequence number in a data byte unit, in a mobile communication system.

Another object of the present invention is to transmit an RLP frame using a sequence number in a block unit and a sequence number in a data byte unit to decrease the size of an RLP frame header to thereby increase transmission efficiency, in a mobile communication system.

Yet another object of the present invention is to transmit an RLP frame using a sequence number in a block unit and a sequence number in a data byte unit to effectively create a NAK (Non Acknowledge) frame for requesting retransmission of an RLP block or a data segment, thus making it possible to perform the increased number of retransmission requests with one NAK frame, in a mobile communication system.

To achieve the above and other objects, there is provided a method for transmitting data in a mobile communication system. The method is comprised of the steps of segmenting a data stream into at least one consecutive frame having a variable data length, the data stream being segmented into a plurality of consecutive blocks having a variable data length, each said consecutive block being segmented into a plurality of sub-consecutive blocks having a byte length; attaching, at each head of the consecutive frames, a header including a first set of bits indicating the sequence number of a consecutive block corresponding to the head and a second set of bits indicating the sequence number of a sub-consecutive block corresponding to the head; and transmitting the header-attached consecutive frames.

BRIEF DESCRIPTION OF THE DRAWINGS

The above and other objects, features and advantages of the present invention will become more apparent from the following detailed description when taken in conjunction with the accompanying drawings in which:

FIGS. 5A to 5D are diagrams illustrating a format of the frames generated according to an embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
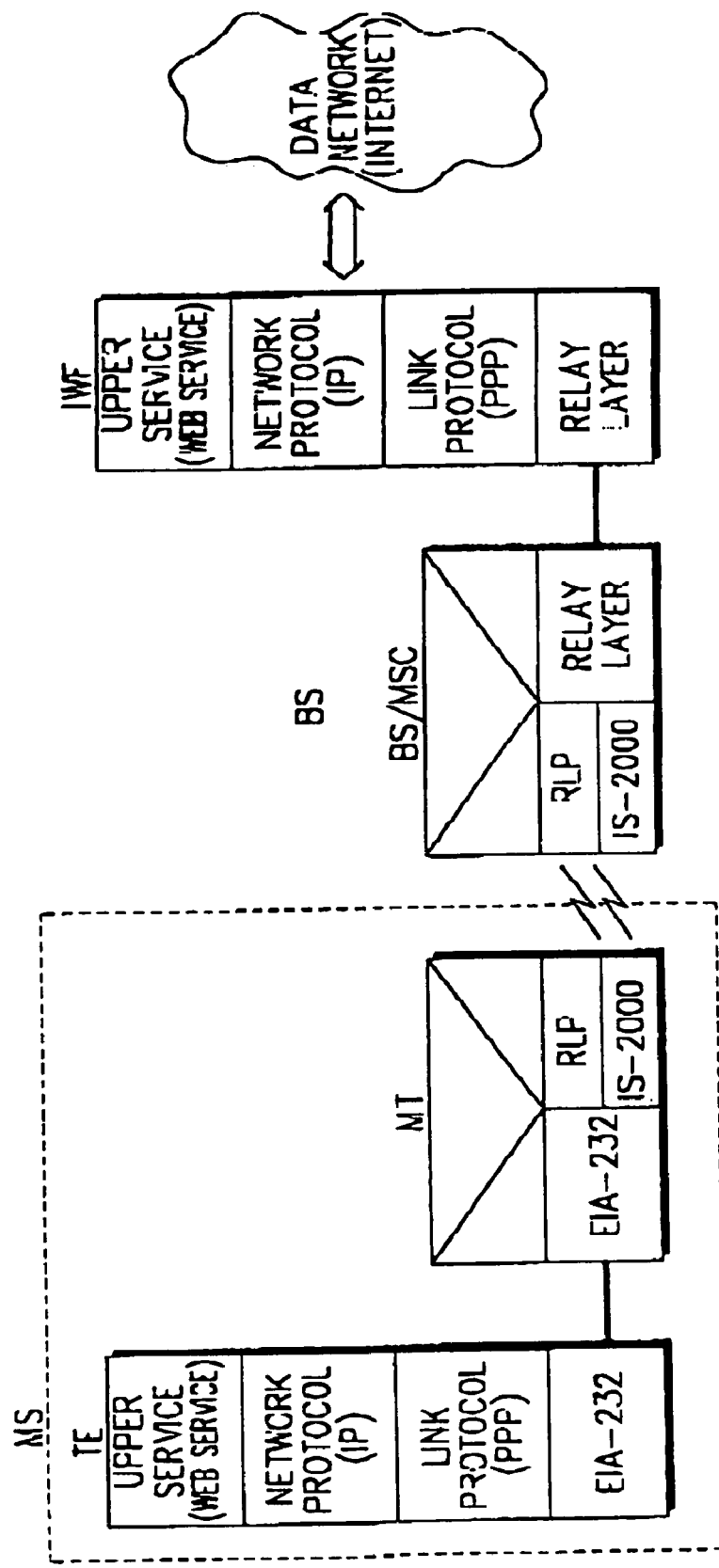
FIG. 1 is a diagram illustrating a general CDMA communication system for performing a packet data service.
Figure 2:
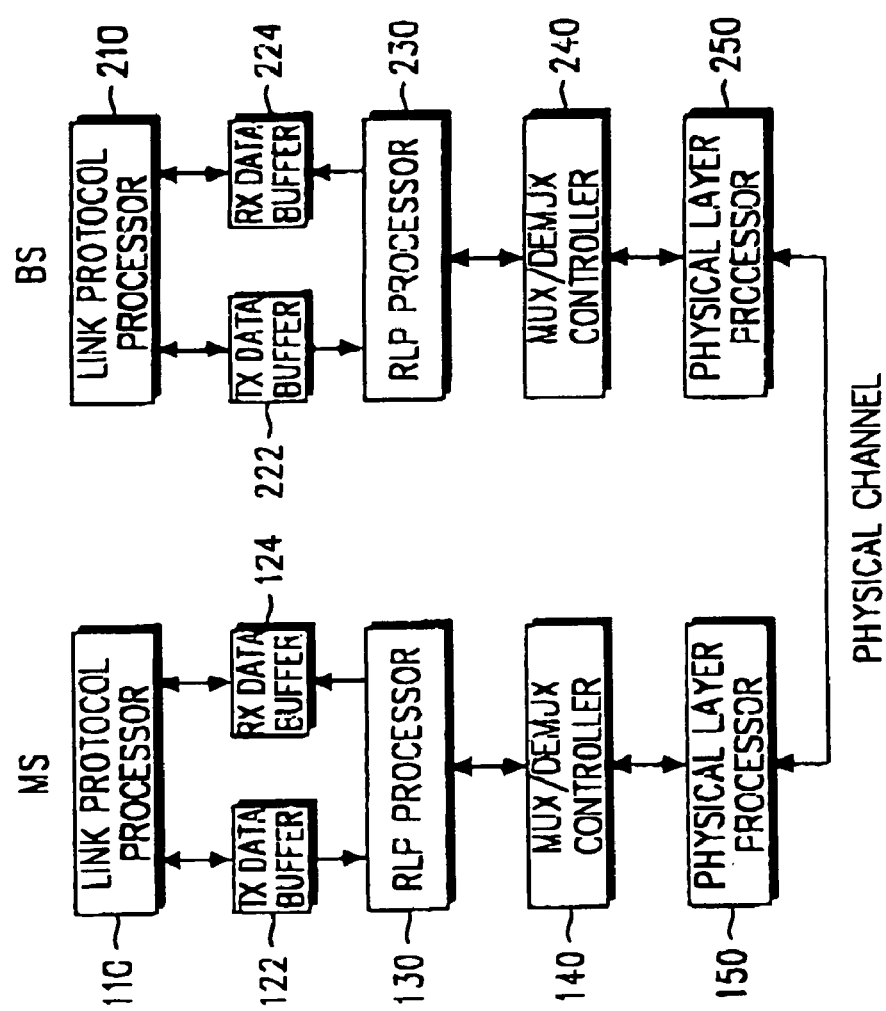
FIG. 2 is a diagram illustrating a device for transmitting and receiving data according to the RLP, to which the present invention is applicable.

FIG. 2 shows a structure of a mobile communication system for transmitting and receiving data according to the RLP, to which the present invention is applicable.

Referring to FIG. 2, physical layer processors 150 and 250 connect a physical channel between the mobile station and the base station, respectively, according to the IS-2000 specification, transmit the RLP frames provided from the associated RLP processors 130 and 230, respectively, to the other party's physical layer over the connected physical channel, and transmit the RLP frames received over the physical channel to RLP processors 130 and 230, respectively. Multiplexing/demultiplexing controllers 140 and 240 are interposed between the respective RLP and physical layer processors.

Multiplexing/demultiplexing controllers 140 and 240 have the multiplexing function of attaching the destination and size information at the head of the RLP frames received from RLP processors 130 and 230, and transmitting the multiplexed RLP frames to the physical layer processors 150 and 250. Further, the multiplexing/demultiplexing controllers 140 and 240 have the demultiplexing function of detecting the destination and size information of RLP frames received from the physical layer processors 150 and 250, and then transmitting the detection results to the upper RLP processors 130 and 230. Transmission data buffers 122 and 222 are memory devices for storing data received from link protocol (i.e., PPP) processors 110 and 210. The transmission data buffers 122 and 222 segment in sequence the stored packets by the required size at the request of the RLP processors 130 and 230, respectively. The reception data buffers 124 and 224 store in sequence the data provided from the RLP processors 130 and 230, respectively. The stored data is transmitted to the PPP processor or the IWF block by the EIA-232 controller or the IS-658 controller. The EIA-232 controller or the IS-658 controller operates according to the EIA-232 specification or the IS-658 specification, respectively, and performs data exchange between the data buffers 122, 124, 222 and 224 and the link protocol processors 110 and 210. For the current CDMA-2000 packet service, it is possible to use a controller other than the EIA-232 controller and the IS-658 controller. For this reason, the controllers are not shown in FIG. 2.

Figure 3:
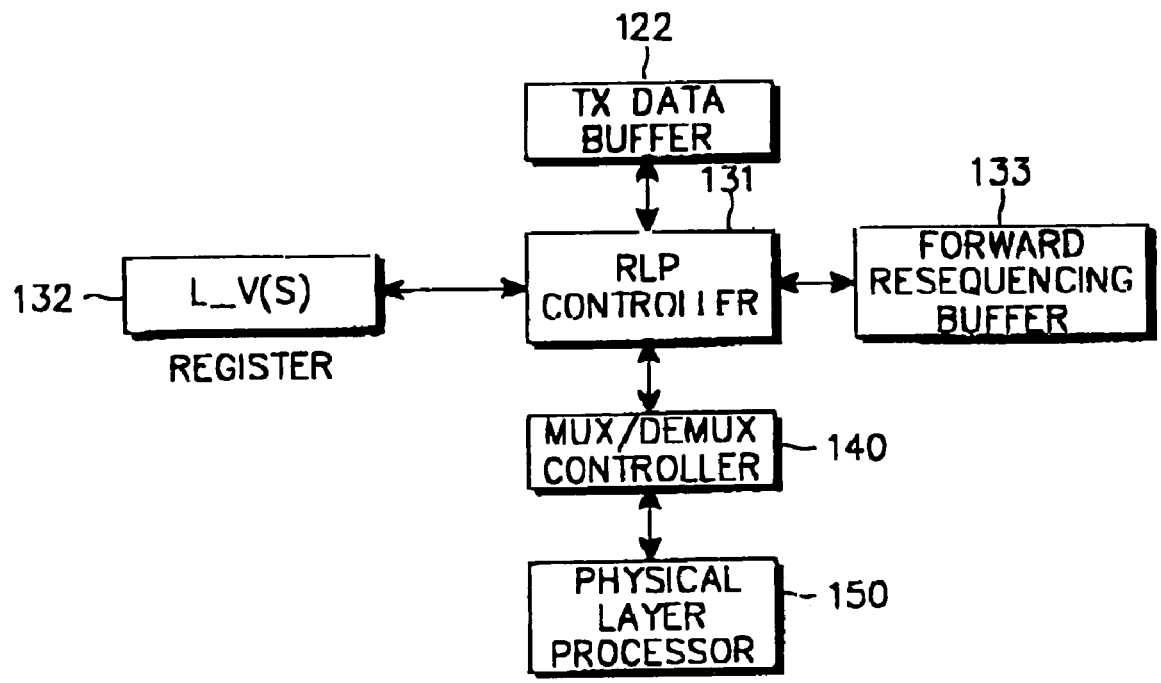
FIG. 3 is a diagram illustrating a data transmitter according to an embodiment of the present invention.

FIG. 3 shows a data transmitter according to an embodiment of the present invention. Referring to FIG. 3, the RLP processor 130 for transmitting the RLP frame includes an RLP controller 131, an L_V(S) register 132, and a forward resequencing buffer (or retransmission buffer) 133. The RLP controller 131 generates an RLP frame by receiving data from the transmission data buffer 122 and transmits a data block filled with the generated RLP frame to the multiplexing/demultiplexing controller 140. The forward resequencing buffer 133 is a memory device for storing resequencing data. The L_V(S) register 132 segments the transmission data stored in the transmission data buffer 122 by the RLP controller 131 into several blocks, assigns a sequence number ('block sequence number') to each block, and counts a sequence number ('data sequence number') to be used when attaching a sequence number to each data byte.

Figure 4:
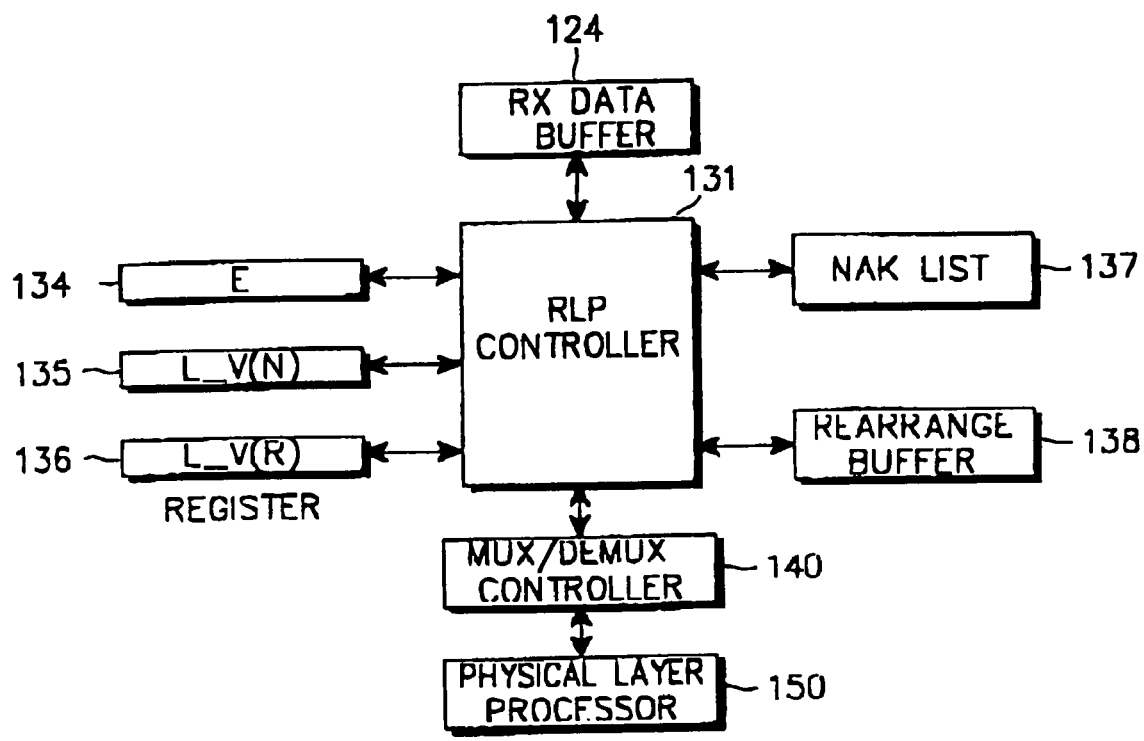
FIG. 4 is a diagram illustrating a data receiver according to an embodiment of the present invention.

FIG. 4 shows a data receiver according to an embodiment of the present invention. Referring to FIG. 4, the RLP processor 130 for receiving the RLP frame includes the RLP controller 131, an E register 134, an L_V(N) register 135, L_V(R) register 136, a NAK list 137 and a rearrange buffer 138. The RLP controller 131 receives the RLP frame from the multiplexing/demultiplexing controller 140 and examines whether the data is received in order. If the data is received in order, the RLP controller 131 stores the data in the reception data buffer 124. Otherwise, the RLP controller 131 stores the data in the rearrange buffer 138, records the portion to be requested for retransmission in the NAK (Non Acknowledge) list 137 and fills, when transmitting the next control frame, the portion stored in the NAK list 137 in the control frame.

The E register 134 records the number of damaged (or bad) data blocks. When the multiplexing/demultiplexing controller 140 notifies the RLP controller 131 of the damaged data blocks, the RLP controller 131 records this value in the E register 134 to use it when reestablishment is required. The L_V(N) register 135 stores the sequence number of a first receive-failed data byte out of the data bytes to be received. The L_V(R) register 136 stores the sequence number of a data byte to be newly received next. For example, if the data bytes of sequence numbers of 1 to 7 are received in which the data bytes of sequence numbers of 3 and 4 are damaged (or receive-failed), the L_V(N) register 135 stores 3 which is the sequence number of the first receive-failed data byte, and the L_V(R) register 136 stores 8 which is a sequence number of the data byte to be newly received.

The operation of generating an RLP frame of variable length and transmitting/receiving the generated RLP frame according to an embodiment of the present invention can be broadly divided into the operation performed by the multiplexing/demultiplexing controllers 140 and 240, and the operation performed by the RLP processors 130 and 230. Since the multiplexing/demultiplexing controllers 140 and 240 have the same operation and the RLP processors 130 and 230 also have the same operation, a description of the operation according to an embodiment of the present invention will be limited to the multiplexing/demultiplexing controller 140 and the RLP processor 130, for simplicity.

A. Tx/Rx Operation of the Multiplexing/Demultiplexing Controller According to One Embodiment of the Present Invention 1. Tx Operation of the Multiplexing/Demultiplexing Controller It is possible to simultaneously transmit not only packet data but also various other types of information, including voice data, over a presently connected physical channel. Therefore, any process providing data to be transmitted to the multiplexing/demultiplexing controller will be referred to as a "service" or "service block". Further, the transmission unit that the multiplexing/demultiplexing controller 140 and the physical layer processor 150 exchange with each other will be referred to as "information bits" or as a "payload of a physical frame", and the transmission unit that the upper layer service blocks, including the RLP processor 130, and the multiplexing/demultiplexing controller 140 exchange with each other will be referred to as "RLP frame" or "data block".

The multiplexing/demultiplexing controller 140 of the transmission side should generate the information bits to be transmitted to the physical layer processor 150 and transmit the generated information bits every set time (e.g., 20 ms). That is, the multiplexing/demultiplexing controller 140 should generate information bits to be filled in a payload of the frame to be transmitted over the physical channel with respect to all the presently connected physical channels and transmit the generated information bits. The IS-2000 specification defines a fundamental channel (FCH), a dedicated control channel (DCCH) and a supplemental channel (SCH). The multiplexing/demultiplexing controller 140 transmits the following fields, when transmitting the generated information bits to the physical layer processor 150 in order to transmit the generated information bits over any one of the fundamental channel, the dedicated control channel and the supplemental channel.

SDU: This field is filled with the information bits to be actually transmitted. If there is no information bit to be transmitted, this field is filled with a null value previously determined between the multiplexing/demultiplexing controller and the physical layer.

FRAME_SIZE: This field is filled with the size information of the physical channel frame in which the information bits are filled. When the SDU field is filled with the null value, this field value is ignored in the physical layer.

FRAME_RATE: This field indicates a transmission rate of the physical channel frame in which the information bits are filled. When the SDU field is filled with the null value, this field value is ignored in the physical channel.

When the multiplexing/demultiplexing controller 140 of the transmission side transmits the above field values to the physical layer processor 150, the physical layer processor 150 processes the provided values in the designated coding and demodulation method and then transmits the processed results to the receiving side.

To generate the payload or information bits of a logical transmission unit to be transmitted to the physical channel, the multiplexing/demultiplexing controller 140 of the transmission side uses a data block to be transmitted in the services corresponding to the physical channel to which the logical channel is presently connected. The service corresponding to the physical channel to which the logical channel is connected, refers to a service which can transmit its data block to the physical channel which will transmit the presently generated information bits. A process for connecting such a service between the mobile station and the base station and connecting the logical channel for the service to the physical channel is available with the signaling message and the signaling procedure, defined by the IS-2000 specification.

The multiplexing/demultiplexing controller 140 of the transmission side receives the data block of a proper length (see FIG. 5A) from the service according to a priority order, upon deciding to transmit the data block for the services corresponding to the physical channel to which the logical channel is presently connected. The multiplexing/demultiplexing controller 140 creates a service identifier and a multiplex frame MuxPDU (see FIG. 5B) in which the length information is attached to the data block, so that it is possible to know the service for transmitting the data block received from the multiplexing/demultiplexing controller of the receiving side when receiving the data block from the service. The multiplex frame MuxPDU can include several data blocks and signaling messages provided from several services. A CRC (Cyclic Redundancy Code) for checking errors can be attached to every one or several MuxPDUs. When the CRC for checking errors every several MuxPDUs is added, one CRC and a portion of the information bits protected by the CRC are called a "logical transmission unit (LTU)", as shown in FIG. 5C. When the CRCs are inserted such that the information bits to be transmitted to the physical layer are segmented into several portions and error checking is performed on every segmented portion, it is said that a "logical transmission unit is used". Here, each portion of the segmented information bits is referred to as a "logical transmission unit", and the remaining portion of the logical transmission unit excluding the CRC, protected by the CRC, will be referred to as "a payload of the logical transmission unit" (FIG. 5C) (one or several MuxPDUs). This logical transmission unit becomes a base unit for determining whether the physical frame is correctly received by the multiplexing/demultiplexing controller on the receiving side. If the logic transmission unit is not used, a basic unit for determining whether the physical frame is correctly received becomes the information bits.

The multiplexing/demultiplexing controller 140 of the transmission side should previously know the possible transmission rate and the size of the information bits with respect to the physical channel to be presently transmitted, and should also know whether the logic transmission unit is used or not, the size of the logic transmission unit if it is used, and a CRC generation method. Such a configuration is used both to determine the size of the information bits generated by the multiplexing/demultiplexing controller 140 according to the present condition of the physical channel provided from the physical layer, and to determine a method for generating the logic transmission unit, within a limit previously determined between the mobile station and the base station. If it is decided to use the logic transmission unit, the multiplexing/demultiplexing controller 140 of the transmission side fills the payload of the logic transmission unit with MuxPDUs including a data block, fills the remaining portion with the fill MuxPDU or the fill bit pattern, and then generates a CRC for the payload of the generated logic transmission unit. The multiplexing/demultiplexing controller 140 on the transmission side repeats the above process as many times as required by the number of the logic transmission units, sequentially fills the information bits with the generated logic transmission units, fills the remaining portion with 0's, and then provides the resulting information bits to the physical layer processor 150.

If it is decided not to use the logic transmission unit, the multiplexing/demultiplexing controller 140 fills the information bits with MuxPDU including a data block, fills the remaining portion with the fill MuxPDU or the fill bit pattern, and then transmits the generated information bits to the physical channel.

When there are no more data blocks to be transmitted, the multiplexing/demultiplexing controller 140 uses the MuxPDU to which is attached a specific service identifier previously appointed with the multiplexing/demultiplexing controller of the receiving side, or uses a regular bit pattern previously appointed with the multiplexing/demultiplexing controller of the receiving side, in order to fill the remaining portion of the information bits. Herein, the MuxPDU to which the specific service identifier is attached will be referred to as "fill MuxPDU" and the regular bit pattern will be referred to as "fill bit pattern".

In the above process, when there is no signaling message or data block received from the services corresponding to the physical channel to which the logical channel is connected, and from the signaling message generator, the multiplexing/demultiplexing controller 140 operates differently according to the physical channel to be presently transmitted. That is, the multiplexing/demultiplexing controller 140 transmits a null value to SDU for the dedicated control channel or the supplemental channel. For the fundamental channel, the multiplexing/demultiplexing controller 140 transmits, as the information bits, a regular bit pattern previously appointed with the multiplexing/demultiplexing controller of the receiving side to the physical channel. Herein, the regular bit pattern will be referred to as "null traffic".

'A null data block' is transmitted to indicate that the service has no data block to transmit to the multiplexing/demultiplexing controller of the transmission side. The null data block is a data block with no contents, and is used only for a special purpose.

2. Rx Operation of the Multiplexing/Demultiplexing Controller

The physical layer processor 150 of the receiving side, shown in FIG. 2, analyzes a received signal using a designated decoding and demodulation method, and transmits the information bits filled in the received physical frame to the multiplexing/demultiplexing controller 140 of the receiving side. The physical layer controller 150 transmits the following information, when transmitting the analyzed information bits to the multiplexing/demultiplexing controller 140.

SDU: This field is filled with the information bits to be actually transmitted. If there is no received information bit or a damaged frame is received, this field is filled with a null value previously determined between the multiplexing/demultiplexing controller 140 and the physical layer processor 150.

FRAME_QUALITY: This field indicates whether or not the received frame is a valid frame.

FRAME_SIZE: This field is filled with the size information of the received physical channel frame. This field value is determined according to a transmission rate of the received physical channel frame.

FRAME_RATE: This field is filled with the transmission rate of the received physical channel frame.

The multiplexing/demultiplexing controller 140 of the receiving side should previously know the transmission rate and size (length and number) of the information bits with respect to the presently received physical channel, and should also know whether the logic transmission unit is used or not, the size of the logic transmission unit if it is used, and a CRC generation method. Such a configuration can be determined according to the above information provided from the physical channel processor 150 within a limit previously appointed between the mobile station and the base station.

If the multiplexing/demultiplexing controller 140 of the receiving side fills the SDU with the null value, judging that no physical channel frame is received, and fills in the FRAME_QUALITY field so as to indicate that a valid frame is received, then the multiplexing/demultiplexing controller 140 of the receiving side informs all the services corresponding to the physical channel to which the logical channel is connected that no frame is received.

When the physical layer processor 150 of the receiving side does not fill the SDU with the null value or fills in the FRAME_QUALITY field so as to indicate that a damaged frame is received, the multiplexing/demultiplexing controller 140 of the receiving side determines whether the logic transmission unit is used for the received frame, based on the configuration and the information provided from the physical layer processor 150 of the receiving side.

If the logic transmission unit is used, the multiplexing/demultiplexing controller 140 of the receiving side determines the length of the logic transmission unit, a CRC checking method and the number of logic transmission units. The multiplexing/demultiplexing controller 140 divides the received information bits into as many logic transmission units as the number of logic transmission units. Since the multiplexing/demultiplexing controller 140 previously knows the length and number of the logic transmission units, it can separate out the logic transmission units by dividing the received information bits into the groups as many as the number of the logic transmission units.

When the assigned physical channel transmits the received information bits, the multiplexing/demultiplexing controller 140 of the receiving side determines whether the received information bits are damaged or not, depending on the FRAME_QUALITY field transmitted from the physical channel. If the received information bits are damaged and the received information bits are segmented into several logic transmission units, the multiplexing/demultiplexing controller 140 analyzes the CRC of each logic transmission unit again, separated in the above process, to determine whether there exist error-free logic transmission units.

If there exists an erroneous logic transmission unit, the multiplexing/demultiplexing controller 140 informs all the services corresponding to the physical channel to which the logic channel is connected that a damaged data block is received, with respect to the erroneous logic transmission unit.

When the received information bits are damaged and the received information bits have no CRC for checking an error every one or several MuxPDUs, the multiplexing/demultiplexing controller 140 of the receiving side informs all the services corresponding to the physical channel to which the logical channel is connected that a damaged data block is received.

When an error-free logic transmission unit or information bits is received, the multiplexing/demultiplexing controller 140 of the receiving side separates out error-free MuxPDUs from the fill bit pattern in the LTU or the information bits. If the separated MuxPDU is not the null traffic or the fill MuxPDU, the multiplexing/demultiplexing controller 140 transmits the data block included in the MuxPDU and a length of the data block to the service designated by the service identifier of the MuxPDU.

After the receiving process, if an error-free logic transmission or information bit is received and there is a service which has failed to receive a data block out of the services in which the logical channel corresponds to the physical channel, the multiplexing/demultiplexing controller 140 of the receiving side informs that a null data block is received.

B. Tx/Rx Operation of The Multiplexing/Demultiplexing Controller According to an Embodiment of the Invention A transmitting/receiving operation of the multiplexing/demultiplexing controller 140 according to an embodiment of the present invention will be more apparent from the following detailed description. The IS-2000 standard specifies several dedicated traffic channels such as a fundamental channel, a supplemental channel and a dedicated control channel. Therefore, the transmitting and receiving operation of the multiplexing/demultiplexing controller 140 according to an embodiment of the invention may be described separately for two cases. One where it is applied to the fundamental channel and another case it is applied to the supplemental channel. Since the dedicated control channel can be applied to a special case where the fundamental channel operates only at 96. Kbps or 14.4 Kbps, a separate description of the dedicated control channel will be avoided herein. Further, the operation may be separately described for the case where the logic transmission unit is used and the other case where the logic transmission unit is not used. Here, the case where the logic transmission unit is used corresponds to a case where data is coded using a convolutional code before transmitting and receiving the data, and the case where the logic transmission unit is not used corresponds to a case where the data is coded using a turbo code before transmitting and receiving the data.

1. Information Bit Number of the Fundamental Channel and Supplemental Channel

Prior to describing an operation according to an embodiment of the present invention, the information bit number of the fundamental channel and the information bit number of the supplemental channel specified by the IS-2000 standard are first shown in Tables 1 to 4. More specifically, Tables 1 and 2 show the information bit number of the fundamental channel specified by the IS-2000 standard, and Tables 3 and 4 show the information bit number of the supplemental channel. Tables 1 and 3 show the information bit number of Rate Set 1 based on the transmission rate of 9600 bps, and Tables 2 and 4 show the information bit number of Rate Set 2 based on the transmission rate of 14400 bps.

TABLE 1

Information Bit Number of IS-2000 Fundamental Channel (Rate Set 1)

| Transmission Rate | Information Bit Number |
| --- | --- |
| 9600 bps | 172 bits |
| 4800 bps | 80 bits |
| 2700 bps | 40 bits |
| 1500 bps | 16 bits |

TABLE 2

Information Bit Number of IS-2000 Fundamental Channel (Rate Set 2)

| Transmission Rate | Information Bit Number |
| --- | --- |
| 14400 bps | 267 bits |
| 7200 bps | 125 bits |
| 3600 bps | 55 bits |
| 1800 bps | 21 bits |

TABLE 3

Information Bit Number of IS-2000 Supplemental Channel (Rate Set 1)

| Transmission Rate | Information Bit Number |
| --- | --- |
| 9600 bps | 172 bits |
| 19200 bps | 360 bits |
| 38400 bps | 744 bits |
| 76800 bps | 1512 bits |
| 153600 bps | 3048 bits |
| 307200 bps | 6120 bits |
| 614400 bps | 12264 bits |

TABLE 4

Information Bit Number of IS-2000 Supplemental Channel (Rate Set 2)

| Transmission Rate | Information Bit Number |
| --- | --- |
| 14400 bps | 267 bits |
| 28800 bps | 552 bits |
| 57600 bps | 1128 bits |
| 115200 bps | 2280 bits |
| 230400 bps | 4584 bits |
| 460800 bps | 9192 bits |
| 1036800 bps | 20712 bits |

It should be noted that Tables 1 to 4 have not shown all the information bit sizes specified by the IS-2000 standard.

When the LTU (Logic Transmission Unit) is used corresponding to the information bit numbers having a sufficient number of bits shown in Tables 3 and 4, the size and number of the LTUs may be calculated as shown in Tables 5 and 6 below. At this point, the information bit number may be calculated by adding the bits remaining after multiplying the size of the LTU by the number of the LTU. In addition, a payload size of the LTU is a value determined by subtracting 16, which is the CRC size, from Tables 5 and 6.

TABLE 5

LTU Applied to Supplemental Channel (Rate Set 1)

| Transmission Rate | LTU Size | LTU Number | Remaining Bits |
|---|---|---|---|
| 9600 bps | — | None | — |
| 19200 bps | — | None | — |
| 38400 bps | 368 bits | 2 | 8 bits |
| 76800 bps | 376 bits | 4 | 8 bits |
| 153600 bps | 376 bits | 8 | 40 bits |
| 307200 bps | 760 bits | 8 | 40 bits |
| 614400 bps | 1528 bits | 8 | 40 bits |

TABLE 6

LTU Applied to Supplemental Channel (Rate Set 2)

| Transmission Rate | LTU Size | LTU Number | Remaining Bits |
|---|---|---|---|
| 14400 bps | — | None | — |
| 28800 bps | — | None | — |
| 57600 bps | 560 bits | 2 | 8 bits |
| 115200 bps | 568 bits | 4 | 8 bits |
| 230400 bps | 568 bits | 8 | 40 bits |
| 460800 bps | 1144 bits | 8 | 40 bits |
| 1036800 bps | 2584 bits | 8 | 40 bits |

It should be noted in Tables 5 and 6 that the LTU is not used for the first two transmission rates. That is, when the supplemental channel having such transmission rates is connected, the multiplexing/demultiplexing controllers of the transmission side and the receiving side follow the information bit processing rule.

The MuxPDU formats proposed in an embodiment of the invention to fill the information bits are shown in Tables 7 to 12 below. Tables 7 and 8 show the MuxPDU formats for the information bits of the fundamental channel (FCH). Tables 9 and 11 show the MuxPDU formats for the information bits of the supplemental channel (SCH), for the case where the LTU is used. Tables 10 and 12 show the MuxPDU formats for the information bits of the supplemental channel, for the case where the LTU is not used. As described above, the dedicated control channel is applied to a special case where only the transmission rate of 9600 bps or 14400 bps is permissible to the supplemental channel, the dedicated control channel permits only the MuxPDU format corresponding to the transmission rates of 9600 bps or 14400 bps, in Table 7 and 8 below.

TABLE 7

MuxPDU format for Information Bits of FCH (Rate Set 1)

| Tx Rate | 1st Service Data Block | Signaling Message | Service Data Block | Service Identifier | MuxPDU Header |
|---|---|---|---|---|---|
| 9600 bps | 171 bits | — | — | — | '0' |
| 9600 bps | 80 bits | 80 bits | — | — | '0001' |
| 9600 bps | 40 bits | 128 bits | — | — | '0101' |

TABLE 7-continued

MuxPDU format for Information Bits of FCH (Rate Set 1)

| Tx Rate | 1st Service Data Block | Signaling Message | Service Data Block | Service Identifier | MuxPDU Header |
|---|---|---|---|---|---|
| 9600 bps | 16 bits | 152 bits | — | — | '1001' |
| 9600 bps | — | 168 bits | — | — | '1101' |
| 9600 bps | 80 bits | — | 85 bits | 3 bits | '0011' |
| 9600 bps | 40 bits | — | 125 bits | 3 bits | '0111' |
| 9600 bps | 16 bits | — | 149 bits | 3 bits | '1011' |
| 9600 bps | — | — | 165 bits | 3 bits | '1111' |
| 4800 bps | 80 bits | — | — | — | — |
| 2700 bps | 40 bits | — | — | — | — |
| 1500 bps | 16 bits | — | — | — | — |

TABLE 8

MuxPDU format for Information Bits of FCH (Rate Set 2)

| Tx Rate | 1st Service Data Block | Signaling Message | Service Data Block | Service Identifier | MuxPDU Header |
|---|---|---|---|---|---|
| 14400 bps | 266 bits | — | — | — | '0' |
| | 124 bits | 138 bits | — | — | '00001' |
| | 54 bits | 208 bits | — | — | '00011' |
| | 20 bits | 242 bits | — | — | '00101' |
| | — | 262 bits | — | — | '00111' |
| | 124 bits | — | 135 bits | 3 bits | '01001' |
| | 54 bits | — | 205 bits | 3 bits | '01011' |
| | 20 bits | — | 239 bits | 3 bits | '01101' |
| | — | — | 259 bits | 3 bits | '01111' |
| | 20 bits | 222 bits | 17 bits | 3 bits | '10001' |
| 7200 bps | 124 bits | — | — | — | '0' |
| | 54 bits | 67 bits | — | — | '0001' |
| | 20 bits | 101 bits | — | — | '0011' |
| | — | 121 bits | — | — | '0101' |
| | 54 bits | — | 64 bits | 3 bits | '0111' |
| | 20 bits | — | 98 bits | 3 bits | '1001' |
| | — | — | 118 bits | 3 bits | '1011' |
| | 20 bits | 81 bits | 17 bits | 3 bits | '1101' |
| 3600 bps | 54 bits | — | — | — | '0' |
| | 20 bits | 32 bits | — | — | '001' |
| | — | 52 bits | — | — | '011' |
| | 20 bits | — | 29 bits | 3 bits | '101' |
| | — | — | 49 bits | 3 bits | '111' |
| 1800 bps | 20 bits | — | — | — | '0' |
| | — | — | 17 bits | 3 bits | '1' |

In Tables 7 and 8, attached to the MuxPDU is a MuxPDU header which is information for segmenting the data blocks included in the MUXPDU. The MuxPDU header is located at the tail of the MuxPDU to byte-arrange the data blocks.

TABLE 9

MuxPDU format for Information Bits of SCH (Rate Set 1, LTU used)

| Tx Rate | Service Identifier | Length Indicator | Length Field | Length of Service Data Block |
|---|---|---|---|---|
| 38400 bps | 3 bits | '000' | — | max 346 bits |
| 76800 bps | 3 bits | '000' | — | max 354 bits |
| 153600 bps | 3 bits | '000' | — | max 354 bits |
| 307200 bps | 3 bits | '000' | — | max 738 bits |
| 614400 bps | 3 bits | '000' | — | max 1506 bits |
| Every Rate | 3 bits | '101' | 8 bits | max 2034 bits |
| Every Rate | 3 bits | '110' | 16 bits | max 524266 bits |

TABLE 10

MuxPDU format for Information Bits of SCH (Rate Set 1, LTU unused)

| Tx Rate | Service Identifier | Length Indicator | Length Field | Length of Service Data Block |
|---|---|---|---|---|
| 19200 bps | 3 bits | '000' | — | max 354 bits |
| 38400 bps | 3 bits | '000' | — | max 738 bits |
| 76800 bps | 3 bits | '000' | — | max 1506 bits |
| 153600 bps | 3 bits | '000' | — | max 3042 bits |
| 153600 bps | 3 bits | '100' | 8 bits | max 3034 bits |
| 307200 bps | 3 bits | '000' | — | max 6112 bits |
| 307200 bps | 3 bits | '100' | 8 bits | max 6104 bits |
| 614400 bps | 3 bits | '000' | — | max 12258 bits |
| 614400 bps | 3 bits | '100' | 8 bits | max 12250 bits |
| Every Rate | 3 bits | '101' | 8 bits | max 2034 bits |
| Every Rate | 3 bits | '110' | 16 bits | max 524266 bits |

TABLE 11

MuxPDU format for Information Bits of SCH (Rate Set 2, LTU used)

| Tx Rate | Service Identifier | Length Indicator | Length Field | Length of Service Data Block |
|---|---|---|---|---|
| 57600 bps | 3 bits | '000' | — | max 538 bits |
| 115200 bps | 3 bits | '000' | — | max 546 bits |
| 230400 bps | 3 bits | '000' | — | max 546 bits |
| 460800 bps | 3 bits | '000' | — | max 1122 bits |
| 1036800 bps | 3 bits | '000' | — | max 2562 bits |
| 1036800 bps | 3 bits | '100' | 8 bits | max 2554 bits |
| Every Rate | 3 bits | '101' | 8 bits | max 2034 bits |
| Every Rate | 3 bits | '110' | 16 bits | max 524266 bits |

TABLE 12

MuxPDU format for Information Bits of SCH (Rate Set 2, LTU unused)

| Tx Rate | Service Identifier | Length Indicator | Length Field | Length of Service Data Block |
|---|---|---|---|---|
| 28800 bps | 3 bits | '000' | — | max 546 bits |
| 57600 bps | 3 bits | '000' | — | max 1122 bits |
| 115200 bps | 3 bits | '000' | — | max 2274 bits |
| 115200 bps | 3 bits | '100' | 8 bits | max 2266 bits |
| 230400 bps | 3 bits | '000' | — | max 4578 bits |
| 230400 bps | 3 bits | '100' | 8 bits | max 4570 bits |
| 460800 bps | 3 bits | '000' | — | max 9186 bits |
| 460800 bps | 3 bits | '100' | 8 bits | max 9178 bits |
| 1036800 bps | 3 bits | '000' | — | max 20706 bits |
| 1036800 bps | 3 bits | '100' | 8 bits | max 20698 bits |
| Every Rate | 3 bits | '101' | 8 bits | max 2034 bits |
| Every Rate | 3 bits | '110' | 16 bits | max 524266 bits |

In Tables 7 to 12, the service identifier can be defined as shown in Table 13 below.

TABLE 13

Service Identifier

| Service Identifier | Service |
|---|---|
| '000' | Reserved |
| '001' | 1st Service |
| '010' | 2nd Service |
| '011' | 3rd Service |
| '100' | 4th Service |
| '101' | 5th Service |
| '110' | 6th Service |
| '111' | Null Service |

In Table 13, the "null service" is a previously determined specific service identifier used to inform the multiplexing/demultiplexing controller of the receiving side that the MuxPDU is the fill MuxPDU. As can be appreciated from Table 13, the MuxPDU formats of Tables 7 to 12 can identify the data blocks provided from a maximum of 6 services.

Tables 7 and 8 show the MuxPDU formats transmitted on the fundamental channel. Here, the $1^{st}$ service can be identified depending only on the MuxPDU header without the service identifier, because the case where the MuxpDU header is '0' corresponds to the $1^{st}$ service. The data blocks corresponding to the $2^{nd}$ to $6^{th}$ services can be determined depending on the service identifiers of Table 7 or 8. Therefore, the service identifiers of Table 7 or 8 can have the values of '010' to '110'. When the data block of the $1^{st}$ service is filled with all 1's in the fundamental channel using the MuxPDU format of Table 7 or 8, the multiplexing/demultiplexing controller of the receiving side appoints the null traffic which does not correspond to any service in the multiplexing/demultiplexing controller of the transmission side. Therefore, when the MuxPDU received from the fundamental channel has only the data block of the $1^{st}$ service and the data block is filled with all 1's, the multiplexing/demultiplexing controller of the receiving side decides the data block is null traffic.

In Tables 7 and 8, as stated above, MuxPDU formats permitted at the transmission rate of 9600 bps or 14400 bps can be transmitted on the dedicated control channel. The data blocks corresponding to the second to sixth services can be determined depending on the service identifier shown in Table 7 or 8. It should be noted that the dedicated control channel does not require the traffic.

In Tables 7 and 8, among the MuxPDU formats permitted at the transmission rate of 9600 bps or 14400 bps, MuxPDU formats including only one service data block rather than a signaling message can be transmitted when the supplemental channel is connected at the transmission rate of 9600 bps or 14400 bps. As stated above, the data blocks corresponding to the second to sixth services can be determined depending on the service identifier shown in Table 7 or 8.

Tables 9 to 12 show MuxPDU formats transmitted when the supplemental channel is connected at the transmission rate of 19200 bps, 28800 bps or more. The data blocks corresponding to the first to sixth services can be determined depending on the service identifier shown in Tables 9 to 12. Therefore, the service identifiers shown in Tables 9 to 12 may have a value of '001' to '110'. For a length indicator of '000', the MuxPDU formats of Tables 9 to 12 include a service block having a length corresponding to the transmission rates in Tables. In the MuxPDU formats of Tables 9 to 12, when the length indicator is set to '100', '101' or '110', the size of the MuxPDU can be calculated using the length field. That is, when the length indicator is set to '100', the MuxPDU formats of Tables 9 to 12 have a the service block having a length determined by subtracting a value determined by multiplying a value indicated in the length field by 8 from the length corresponding to the transmission rates of the Tables. For example, if a MuxPDU received over the supplemental channel which is connected at the transmission rate of 614400 bps and does not uses the LTU, has a length indicator set to '100' and a length field set to '00000010', a length of the service block included in the received MuxPDU is 12250−(2×8)=12234 bits from Table 9. When the length indicator is set to '101' or '110', the MuxPDU formats of Tables 9 to 12 have a the service block having a length determined by subtracting 6 bits, which is the size of the MuxPDU, from a valued determined by multiplying 8 by a value determined by adding 1 to a value indicated in the length field. That is, if a MuxPDU received over the supplemental channel which is connected at the transmission rate of 614400 bps and does not uses the LTU, has a length indicator set to '110' and a length field set to '0000 0101 1111 1001' (1529 in decimal), a length of the service block included in the received MuxPDU is (1529+1)×8−6=12234 bits.

2. Tx Operation of the Multiplexing/Demultiplexing Controller on the FCH

Figure 10:
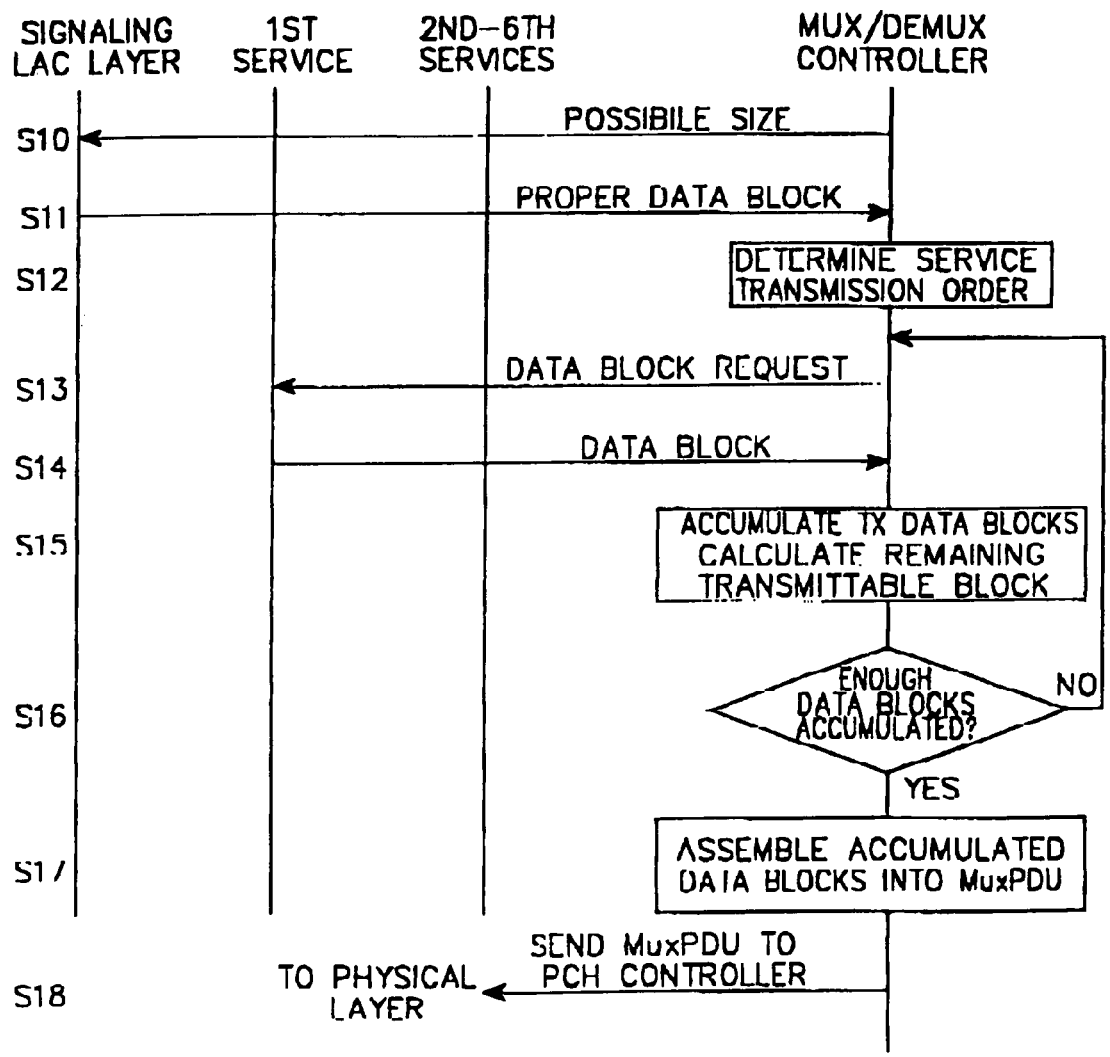
FIG. 10 is a flow diagram illustrating a procedure for transmitting the fundamental channel according to an embodiment of the present invention.

Assuming that the 6 services using the RLP are connected, the multiplexing/demultiplexing controller of the transmission side operates as follows. This operation is performed according to the procedure shown in FIG. 10.

First, the multiplexing/demultiplexing controller 140 of FIG. 3 determines the transmitting order of the services and the size of the data blocks according to a QoS (Quality of Service) guarantee rule. That is, the multiplexing/demultiplexing controller inquires of a signaling LAC layer about a possible size (Step S10 of FIG. 10), and determines a data block of a proper size for the data block from the signaling LAC layer (Step S11). The multiplexing/demultiplexing controller determines the order of transmitting the services (Step S12), requests the $1^{st}$ service to provide a data block of the determined size (Step S13), and receives the data block within the determined size from the $1^{st}$ service (Step S14). For a data block to be transmitted to the fundamental channel, the RLP processor should be requested to generate the data block of a proper size according to the size and number of the data blocks that the MuxPDU permits in Table 7 or 8, and a combination of them. Thereafter, the multiplexing/demultiplexing controller accumulates the data blocks to be transmitted and calculates the remaining blocks which can be transmitted (Step S15). Next, the multiplexing/demultiplexing controller determines whether or not it is possible to assemble the MuxPDU using the accumulated data blocks (Step S16). If it is not possible to assemble the MuxPDU, the multiplexing/demultiplexing controller returns to step S12 to request the corresponding service to provide the data block, and is provided with the requested data block. Otherwise, if it is possible to assemble the MuxPDU, the multiplexing/demultiplexing controller assembles the MuxPDU using the accumulated data blocks (Step S17). The multiplexing/demultiplexing controller selects a proper bit pattern from Table 4 and attaches the selected bit pattern to the MuxPDU header. The multiplexing/demultiplexing controller transmits the generated MuxPDU to the physical channel in the information bits (Step S18).

For the RLP processor which has failed to generate a data block in the above process, the multiplexing/demultiplexing controller requests the RLP processor to generate a blank data block so as to enable the RLP processor to know the fact that it has failed to have the opportunity. In addition, if every RLP processor has provided no data block in the above process, the multiplexing/demultiplexing controller assembles the null traffic and transmits it as the information bits to the physical channel.

3. Rx Operation of the Multiplexing/Demultiplexing Controller on the FCH

The multiplexing/demultiplexing controller of the receiving side operates as follows with respect to the information bits transmitted over the fundamental channel.

Figure 11:
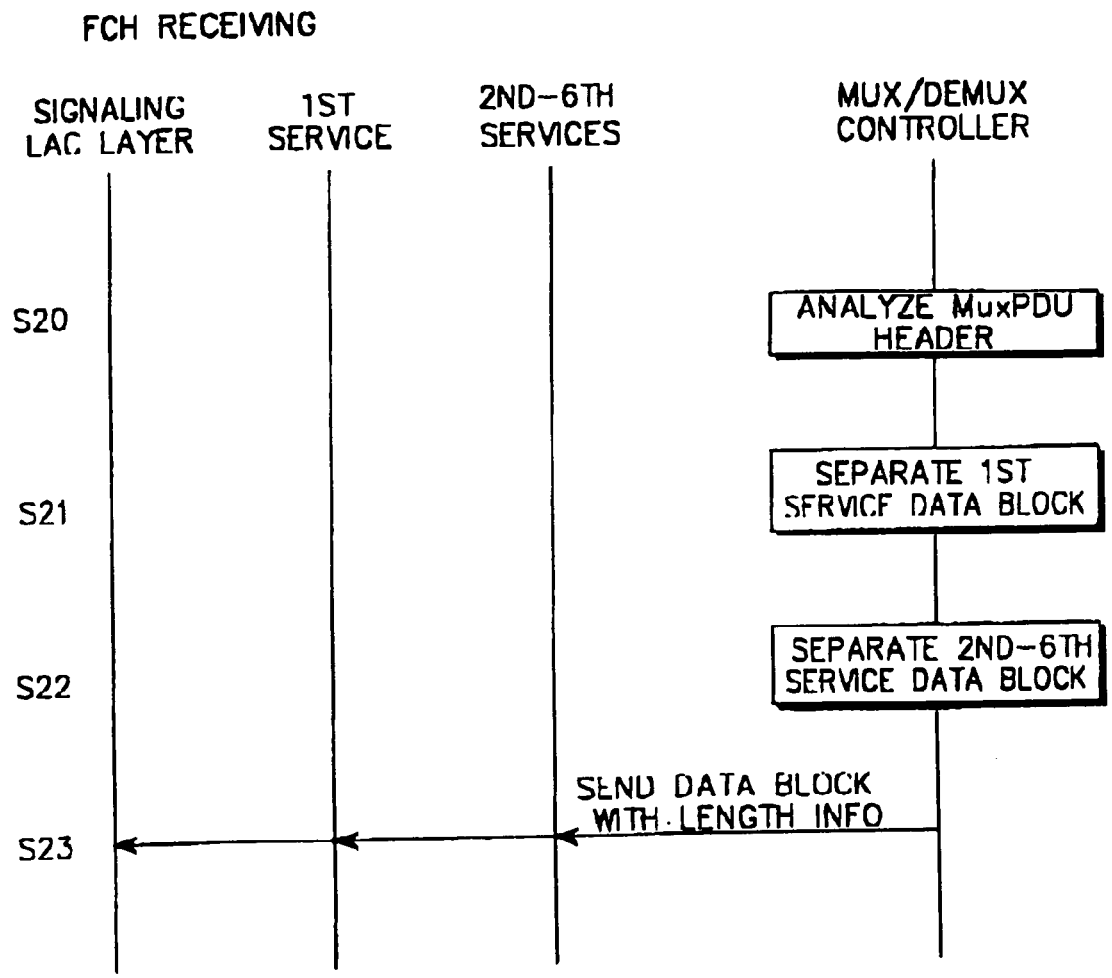
FIG. 11 is a flow diagram illustrating a procedure for receiving the fundamental channel according to an embodiment of the present invention.

This operation is performed according to the procedure shown in FIG. 11. The multiplexing/demultiplexing controller analyzes the transmission rate and the MuxPDU header of the received information (Step S20 of FIG. 11), and distinguishes the data blocks (Steps S21 and S22) based on the analysis. To distinguish the data blocks, reference should be made to Tables 7 and 8 according to the Rate Sets. If the last 1 bit of the received information bits is set to '0', all the information bits other than the last 1 bit constitute a data block of the first service, so that it is transmitted to the first service together with the length information of the data block (Step S23).

Otherwise, when the last 1 bit of the received information bits is set to '1' in the above process, the multiplexing/demultiplexing controller of the receiving side regards the last 4 bits as the MuxPDU for the Rate Set 1, and regards the last 5 bits as the MuxPDU for the Rate Set 2. A combination having a bit pattern of the MuxPDU is searched from Table 7 or 8. If there is no combination having the same bit pattern, the multiplexing/demultiplexing controller of the receiving side considers the received information bits as damaged bits. Otherwise, if there exists a combination having the same bit pattern, the multiplexing/demultiplexing controller separates the data block and the service identifier according to the size and position of the data block specified in Table 7 or 8. For example, for the Rate Set 1, if the information bits are received at 9600 bps and the MuxPDU header is '0011', the first 80 bits of the received MuxPDU constitute a data block of the first service, the next 85 bits constitute a data block of another service, and the remaining 3 bits is the service identifier. The service identifier may not exist according to the combinations, as specified in Table 7 or 8.

The data block separated in the above process is transmitted to the corresponding service with reference to Table 7 or 8. It is possible to transmit the data block to the first service and the signaling layer together with the length information of the data block, without analyzing the service identifier. However, if there exists the service identifier, the service identifier is compared with Table 13 to transmit the data block to the corresponding service together with the length information of the data block. In this example, the multiplexing/demultiplexing controller of the receiving side transmits the 80-bit data block to the first service together with its length information, and transmits the 85-bit data block to the service indicated by the service identifier together with its length information. If the service identifier's value is set to '000', '001' or '111', the multiplexing/demultiplexing controller of the receiving side considers the received information bits as damaged bits. If the received information bits are damaged bits, the multiplexing/demultiplexing controller informs all the services which have a logical channel on the fundamental channel, that a damaged data block has been received, and also informs the maximum length of the data block at which the respective services can transmit. For example, for the MuxPDU format of Table 7 used at the Rate Set 1, 171 bits are transmitted to the first service, and 165 bits are transmitted to the second to sixth services.

Otherwise, if the information bits are not damaged, there is only one data block and the data block corresponding to the first service is filled with all 1's, then the multiplexing/demultiplexing controller of the receiving side discards the information bits, regarding them as null traffic, and informs all the services, which have a logical channel on the fundamental channel, that no data block is received. When the information bits are not damaged, and one or more services of the services which have logical channels on the fundamental channel receive no data blocks, the multiplexing/demultiplexing controller of the receiving side informs those services that a null data block is received. It should be noted that for the null traffic, informing receipt of no data block and informing receipt of a null data block may have different meanings according to the service.

4. Tx Operation of the Multiplexing/Demultiplexing Controller on the SCH

When generating the information bits for the supplemental channel, the multiplexing/demultiplexing controller generates as many LTUs as the number shown in Table 5 or 6 according to the transmission rate. The LTU has the size shown in Table 5 or 6. Since the LTU has a 16-bit CRC, the maximum size of the MuxPDU which can be actually transmitted over the LTU varies according to the transmission rates.

For example, when a supplemental channel of 307.2 Kbps is used and the LTU is generated, the payload of the LTU includes the MuxPDU, so that the maximum size of the MuxPDU is 744 bits (as determined by subtracting 16 CRC bits from 760 bits of the LTU payload). When the multiplexing/demultiplexing controller generates the LTU while generating the information bits of the supplemental channel, the possible MuxPDU format according to the Rate Sets are shown in Tables 9 and 11. If the multiplexing/demultiplexing controller generates the MuxPDU to fill up the LTU payload, the multiplexing/demultiplexing controller generates a 16-bit CRC for the LTU payload. The 16-bit CRC is generated in the same manner as a 16-bit CRC generating method which is applied to the supplemental channel. In this manner, the multiplexing/demultiplexing controller generates as many LTUs as the number specified in Table 5 or 6, sequentially puts them in the information bits, and then fills the remaining portion with 0's before transmission to the physical layer processor.

If LTUs are not generated when generating the information bits of the supplemental channel, the multiplexing/demultiplexing controller generates the supplemental channel information bits of a size designated in Table 3 or 4 according to the transmission rate. In this case, for a transmission rate of 9600 bps or 14400 bps, only one MuxPDU filled with only one service data block specified in Tables 7 and 8 can be carried by the information bits. The multiplexing/demultiplexing controller generates the MuxPDU to fill the information bits with the generated MuxPDU and then transmits the generated information bits/MuxPDU to the physical layer processor.

If LTUs are not generated, the multiplexing/demultiplexing controller can use the MuxPDU formats of Tables 10 and 12 for a transmission rate of 19200 bps or 28800 bps or more. The multiplexing/demultiplexing controller generates the MuxPDU to fill the information bits with the generated MuxPDU and then transmits the generated information bits/MuxPDU to the physical layer processor.

Figure 12:
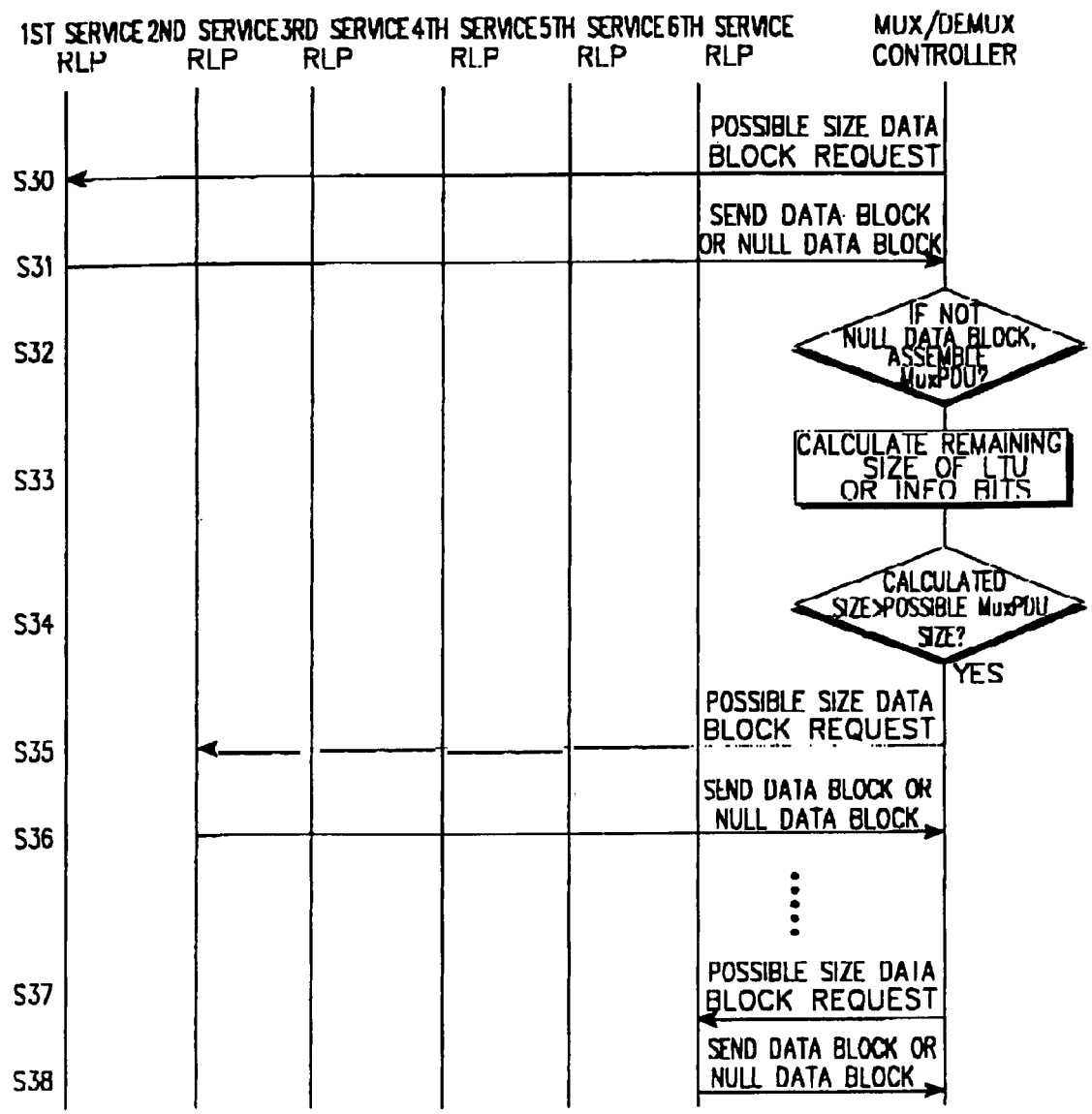
FIG. 12 is a flow diagram illustrating a procedure for transmitting the supplemental channel according to an embodiment of the present invention.

The operation of transmitting on the supplemental channel is performed according to the procedure shown in FIG. 12. The multiplexing/demultiplexing controller determines the order of transmitting the services and the size of the data blocks according to the QoS guarantee rule. Next, the multiplexing/demultiplexing controller sends a data block request to the RLP of the respective services according to the priority order (Step S30 of FIG. 12). That is, the multiplexing/demultiplexing controller sends a possible data block request to the RLP processor of the first service having the top priority (Step S30), and receives a corresponding data block or a null data block from the RLP processor of the first service (Step S31). Upon receipt of the data block rather than the null data block, the multiplexing/demultiplexing controller generates the MuxPDU using the received data block (Step S32). The generated MuxPDU is assembled into the information bits.

If LTUs are generated when generating the information bits of the supplemental channel, the multiplexing/demultiplexing controller should request the RLP processor to generate a data block of proper size according to the size of the data block permitted by the MuxPDU in Table 9 or 11 and the remaining portion of the LTU which is presently being generated. That is, upon receipt of the data block, the multiplexing/demultiplexing controller calculates the size of the LTU or the remaining portion of the information bits (Step S33), and determines whether the calculated size is larger than or equal to the possible size of the MuxPDU (Step S34). If the calculated size is larger than or equal to the possible size of the MuxPDU, the multiplexing/demultiplexing controller sends a request for the data block of the possible size to the RLP processor of the second service having the next top priority (Step S35), and receives a corresponding data block or a null data block from the RLP processor of the second service (Step S36). This operation is repeatedly performed on the RLP processors of all the services.

If LTUs are not generated when generating the information bits of the supplemental channel, the multiplexing/demultiplexing controller requests the respective services to generate a data block which can be transmitted to the supplemental channel specified in Tables 7 and 8 according to the priority order for the transmission rate of 9600 bps or 14400 bps, in order to generate one MuxPDU format which can be transmitted to the supplemental channel, out of the MuxPDU formats specified in Tables 7 and 8. If any one of the services generates a data block, the multiplexing/demultiplexing controller assembles this into the MuxPDU.

For the transmission rate of 19200 bps or 28800 bps, if LTUs are not generated when generating the information bits of the supplemental channel, the multiplexing/demultiplexing controller should request the RLP processor to generate a data block of proper size according to the data block size permitted by the MuxPDU in Table 10 or 12 and the remaining portion of the LTU which is presently generated (Steps S32 to S38).

If the multiplexing/demultiplexing controller fills the LTU payload or the information bits while generating the information bits of the supplemental channel, the multiplexing/demultiplexing controller should know the LTU payload which is not yet filled and the length of the remaining portion of the information bits. The multiplexing/demultiplexing controller requests the services to generate a data block for the remaining portion. If a data block which is not a null data block is received from a certain service, the multiplexing/demultiplexing controller operates according to the length of this data block, as follows.

First, if the length of the received data block is shorter by 4 bits than the LTU payload or the remaining portion of the information bits, the multiplexing/demultiplexing controller assembles the MuxPDU by attaching a 3-bit service identifier and a length indicator set to '0' at the head of the data block according to the service from which the data block is received, based on Table 13. The multiplexing/demultiplexing controller puts the generated MuxPDU in the LTU payload or the remaining portion of the information bits thereby to complete the LTU payload or the information bits.

Second, if the length of the transmitted data block is shorter by 14 bits or more than the remaining portion of the LTU payload or the information bits, the multiplexing/demultiplexing controller creates a MuxPDU having a 8-bit or 16-bit length field shown in Tables 9 to 12. That is, when the created data block is equal to or smaller than 2034 bits, the multiplexing/demultiplexing controller attaches a 3-bit service identifier according to the transmission service, based on Table 13, and sets the 3-bit length indicator to '101' and the 8-bit length field to a value determined by subtracting 1 from a value determined by expressing in bytes the total length of the MuxPDU determined by summing the service identifier, the length indicator, the length type field, the length field and the data block. If the created data block is larger than 2034 bites, the multiplexing/demultiplexing controller attaches the 3-bit service identifier according to the transmission service, based on Table 13, and sets the 3-bit length indicator to '110' and the 16-bit length field to a value determined by subtracting 1 from a value determined by expressing in bytes the total length of the MuxPDU determined by summing the service identifier, the length indicator, the length type field, the length field and the data block. The multiplexing/demultiplexing controller may generate a MuxPDU having the 8-bit length field and the length field of '100' shown in Tables 9 to 12. That is, it is possible to create the MuxPDU by filling in the 8-bit length field indicating in bytes how small it is as compared with the maximum size of the data block shown in Tables 9 to 12. When the size of the created MuxPDU is not an integer, i.e., when the length of the MuxPDU is not expressed in bytes, the multiplexing/demultiplexing controller discards the data block. If the size of the created MuxPDU is an integer, the multiplexing/demultiplexing controller attaches the service identifier, the length indicator, the length type field and the length field at the head of the data block, thereby creating the MuxPDU. The multiplexing/demultiplexing controller fills the created MuxPDU in the remaining portion of the LTU payload or the information bits.

The above process is repeatedly performed on the portion remaining after sequentially putting the generated MuxPDU in the payload of the LTU. In the process, if there is no more data blocks of proper size, the multiplexing/demultiplexing controller fills the first 6 bits in the remaining portion by setting the service identifier to '111' and the length indicator to '000', and then fills in the remaining portion to all 0's, thereby filling the LTU payload or the information bits.

In the case where LTUs are generated, if as many LTUs are generated as the number specified in Table 5 or 6, the multiplexing/demultiplexing controller sequentially puts all the generated LTUs in the information bits. The multiplexing/demultiplexing controller fills the remaining portion with all 0's as shown in Table 5 or 6, and transmits it to the physical channel processor.

In the case where LTUs are not generated, if the information bits specified in Table 3 or 4 are all filled in the above process, the multiplexing/demultiplexing controller transmits it to the physical layer processor.

Figure 6A:
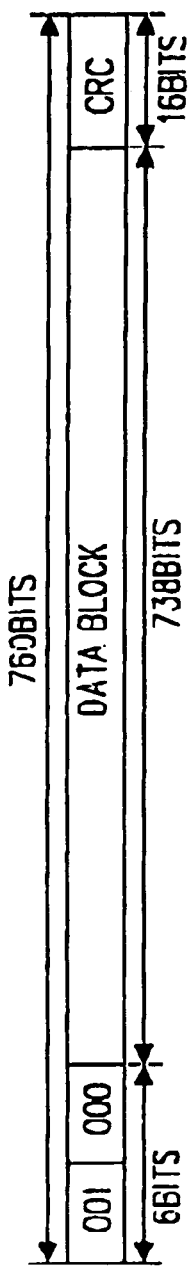
FIGS. 6A to 6C are diagrams illustrating a format of the LTU (Logical Transmission Unit) generated according to an embodiment of the present invention.
Figure 6B:
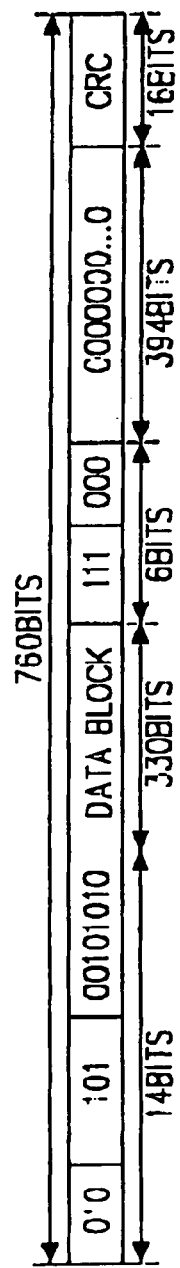
Figure 6C:
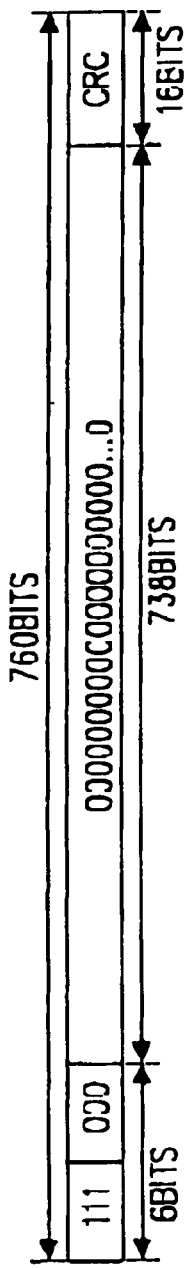

FIGS. 6A to 6C show LTU formats generated according to an embodiment of the present invention. The LTUs constitute an information frame (physical frame or information bits) to be transmitted over the physical channel, and each LTU is comprised of a multiplex frame MuxPDU and a CRC. Although the description will be made of the case where the information frame is comprised of LTUs, the information frame can be comprised of only MuxPDUs without the CRC. The consecutive multiplex frames MuxPDUs included in a LTU may have a given length (e.g., 744 bits as shown in FIG. 5C), and each multiplex frame MuxPDU is comprised of a header and a succeeding RLP frame (or data block) as shown in FIG. 5B. The RLP frame includes transmission data. At least one of the multiplex frames MuxPDUs is comprised of a plurality of sub-multiplex frames, and each sub-multiplex frame is comprised of a header including an RLP service identifier field and a length indication field indicating a length of the transmission data, and a succeeding data block. That is, the multiplex frame MuxPDU can be either one sub-multiplex frame comprised of a data block for a specific service and a header indicating the data block, or a plurality of sub-multiplex frames each comprised of a data block for a specific service and a header indicating the data block. FIG. 6A shows a case where the multiplex frame MuxPDU is comprised of one sub-multiplex frame, i.e., includes only one data block. FIG. 6B shows a case where the multiplex frame MuxPDU is comprised of a plurality of sub-multiplex frames, i.e., includes a plurality of data blocks. The operation of generating the data block (or RLP frame) is performed by the RLP controller 131 of FIG. 3, the operation of generating the multiplex frame MuxPDU is performed by the multiplexing/demultiplexing controller 140 of FIG. 3, and the operation of generating the information frame (or physical frame) is performed by the physical layer processor 150 of FIG. 2.

Referring to FIG. 6A, the first LTU corresponds to a case where a 738-bit data block is received from the first service, and is shorter than the LTU payload (744 bits) by 6 bits exactly, so that the service identifier is set to the first service '001', the length indicator is set to '000' and then the payload of the LTU is filled with the received data block. Here, the service identifier and the length indicator constitute a header of the multiplex frame MuxPDU. As shown in Tables 9 to 13, the service identifier of '001' indicates a length of the succeeding data block. For example, with reference to Table 9, assuming that the LTU is used and the transmission rate is 307200 bps at the Rate Set 1, if the multiplex frame includes only one data block and the length indicator is '000', then the length of the service data block is 728 bits.

Referring to FIG. 6B, the second LTU corresponds to a case where a 330-bit data block is received from the second service, and is shorter by over 14 bits than the remaining LTU payload (744 bits–330 bits=414 bits) and is shorter than 2034 bits which are the maximum length of the service data block available at every transmission rate, shown in Table 12, so that the service identifier is set to the second service '010', the length indicator is set to '101', and then the length field is set to a value '00101010(=42)' determined by subtracting one from 43 bytes (344 bits) which is the total length of the MuxPDU. The LTU payload portion of the remaining 50 bytes (400 bits) corresponds to a case where no data block is received from the services. In this case, the fill MuxPDU is generated and put in this portion. Here, the service identifier and the length indicator constitute a header of the multiplex frame MuxPDU. The LTU, i.e., the multiplex frame is comprised of two sub-multiplex frames. In the first sub-multiplex frame, the service identifier of '010' indicates that the succeeding data block is for the second service. The length indicator of '101' and the length field of '00101010' indicate the length of the data block for the second service included in the MuxPDU.

The second sub-multiplex frame is assembled by filling a data block for the second service and the fill MuxPDU in the payload of the LTU. The service identifier of '111' indicates that the succeeding data block is for a null service, and the length indicator of '000' indicates the length of the data block for the null service, as shown in Table 13.

Referring to FIG. 6C, the third LTU corresponds to a case where no data block is provided from the services when generating the LTU. In this case, the fill MuxPDU is generated and put in the LTU. By filling the information bits with the LTUs shown in FIGS. 6A to 6C and setting the remaining bits to '000', generation of the information bits (or information frame) is completed.

5. Rx Operation of the Multiplexing/Demultiplexing Controller on the SCH

Figure 13:
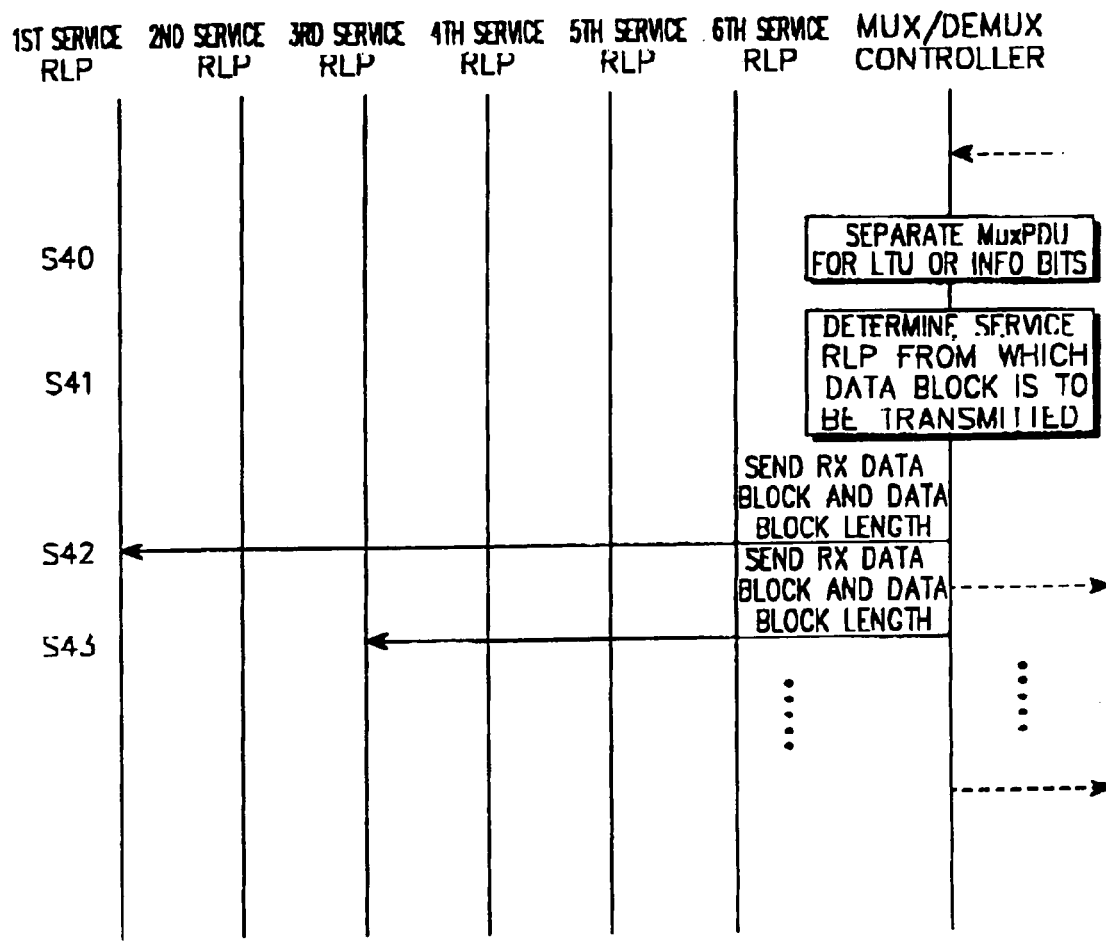
FIG. 13 is a flow diagram illustrating a procedure for receiving the supplemental channel according to an embodiment of the present invention.

The multiplexing/demultiplexing controller of the receiving side operates as follows for the information bits transmitted over the supplemental channel (SCH). This operation is performed according to the procedure shown in FIG. 13.

For the information bits using LTUs, the LTU is divided according to the transmission rate as shown in Table 5 or 6. For example, for information bits received over the supplemental channel connected at 307.2 Kbps, the LTUs are segmented into a unit of 760 bits as shown in Table 5. If the information bits have no errors, the multiplexing/demultiplexing controller separates the MuxPDU from each LTU or information bits (Step S40 of FIG. 13). After separating the MuxPDU, the multiplexing/demultiplexing controller determines the RLP of a service to which the data block will be transmitted (Step S41), and transmits the received data block to the RLP of the corresponding service. At this point, the length information of the data block is transmitted together with the received data block (Steps S42 and S43). This operation of transmitting the received data block and the length information of the data block to the RLP of the corresponding service is performed on every separated MuxPDU.

Otherwise, if the information bits have errors, the multiplexing/demultiplexing controller performs CRC checking on each individual LTU. For the error-free LTUs, the multiplexing/demultiplexing controller separates out the MuxPDU. However, for the LTUs having errors, the multiplexing/demultiplexing controller informs all the services which have a logical channel on the supplemental channel, that a damaged data block is received, and also informs those services of the maximum length of the data block that the respective services can transmit in a LTU, and then discards the information bits. For example, the maximum length of the data block to be transmitted in a LTU that was received over the supplemental channel connected at 307.2 Kbps, is 738 bits as shown in FIGS. 6A to 6C.

For the information bits received which were not generated using LTUs, the MuxPDU is separated according to Table 7 or 8 for the transmission rate of 9600 bps or 14400 bps. The MuxPDU separating method is performed in the same manner as in the fundamental channel. However, in the supplemental channel, since only one data block received from the service which has a logical channel corresponding to the supplemental channel can exist in the MuxPDU, the information bits having a different MuxPDU header are considered to be damaged.

For the information bits received which were not generated using LTUs, the MuxPDU is separated over all of the information bits for the transmission rate of 19200 bps or 28800 bps. If the information bits have errors, the multiplexing/demultiplexing controller informs all the services, which have a logical channel on the supplemental channel, that a damaged data block is received, and then discards the information bits.

When separating the MuxPDU from the LTU payload or information bits, it is possible to know to which service the data block of the MuxPDU should be transmitted, depending on the service identifier, the length indicator and the length field, and to know the full length of the received MuxPDU, as follows.

First, the multiplexing/demultiplexing controller of the receiving side begins MuxPDU separation at the head of the LTU payload or the information bits.

Second, if the service identifier of the MuxPDU, which is now being analyzed, is set to '111' as shown in Table 13, the multiplexing/demultiplexing controller of the receiving side discards all the remaining portion of the LTU payload or the information bits.

Third, if the service identifier of the MuxPDU, which is now being analyzed, is set to '000' as shown in Table 13, the multiplexing/demultiplexing controller of the receiving side considers the LTU payload or the information bits to be damaged.

Fourth, if the service identifier of the MuxPDU, which is now being analyzed, is set to a value between '001' and '110', which indicates one of the services which have a logic channel on the supplemental channel, the next 3-bit length indicator will be analyzed. If the service identifier does not indicate one of the services which have a logic channel on the supplemental channel, the multiplexing/demultiplexing controller will consider the LTU payload or the information bits to be damaged.

Fifth, if the 3-bit length indicator is set to '000', the remaining portion of the LTU payload or the information bits constitutes one MuxPDU. Therefore, a data block from the MuxPDU having a length determined by subtracting 6 bits from the remaining portion's length is transmitted to the upper service.

Sixth, if the 3-bit length indicator is set to '100', '101' or '110', the next 3-bit length field will be analyzed. If the 3-bit length field is not set to '000', '100'' '101' or '110', the multiplexing/demultiplexing controller of the receiving side will consider the LTU payload or the information bits to be damaged.

Seventh, if the 3-bit length type field is set to '100', a portion corresponding to a length determined by subtracting a value determined by multiplying the 8-bit length field value by 8 from the maximum size of the MuxPDU which can be filled in the LTU payload or the information bits, constitutes one MuxPDU. Therefore, a portion of the MuxPDU from which the 14-bit header is excluded, is transmitted to the upper service as a data block together with length information of the data block.

Eighth, if the 3-bit length type field is set to '101' or '110', the next 8-bit or 16-bit length field will be analyzed. If a value determined by adding 1 to the length field value is larger than a value determined by expressing in bytes the length of the remaining portion of the LTU payload or the information bits, the multiplexing/demultiplexing controller of the receiving side will consider the LTU payload or the information bits to be damaged.

Ninth, if the value determined by adding 1 to the length field value is smaller than or equal to the value determined by expressing in bytes the length of the remaining portion of the LTU payload or the information bits, the determined value is the length of the MuxPDU. Therefore, the remaining portion determined by subtracting the 14-bit or 22-bit header from the MuxPDU having the length value determined in the remaining portion of the LTU payload or the information bits is transmitted to the upper service as a data block together with its length information.

Finally, if there exists a remaining portion of the LTU payload or the information bits after determining the MuxPDU, the above process will be performed again on the remaining portion.

C. Tx/Rx Operation of the RLP Controller According to an Embodiment of the Present Invention Operation of the RLP controller 131 shown in FIGS. 3 and 4, performed according to an embodiment of the present invention, will be divided as follows.

1. Data Transmitting Operation of the RLP Controller

The RLP controller 131 receives a data stream stored in the transmission data buffer 122 and, when the multiplexing/ demultiplexing controller 140 requests a data block, generates an RLP frame having a size of the requested data block. The data stream stored in the transmission data buffer 122 is regarded as having an infinite length. Therefore, the RLP controller 131 transmits the data stream without distinguishing between the start and end portions.

The RLP controller 131 segments the data stream stored in the transmission data buffer 122 into the blocks of proper length. The blocks may have either the same size or different sizes. In either case, however, the blocks have a size of over one byte and of $N_{DATA}$ bytes in maximum.

The RLP controller 131 assigns sequence numbers of 0 to ($N_{BLOCK}$-1) to the blocks. In the description below, the sequence number assigned to the block will be referred to as a "block sequence number". The RLP controller 131 assigns a sequence number 0 to a first generated block. When a new block is generated, the RLP controller 131 assigns a sequence number determined by increasing the sequence number of the previous block by one to the new block. If the previous block is assigned a sequence number of ($N_{BLOCK}$-1), the RLP controller 131 will again assign the sequence number 0 to the new block.

In addition, the RLP controller 131 assigns sequence numbers of 0 to ($N_{DATA}$-1) to data bytes in the new block. In the description below, the sequence number assigned to the data byte will be referred to as a "data sequence number". The RLP controller 131 assigns a sequence number 0 to a first data byte in the block. The RLP controller 131 assigns a sequence number determined by increasing the sequence number of the previous byte by one to the next byte. Since the blocks can have the size of $N_{DATA}$ bytes in maximum, the sequence numbers of 0 to ($N_{DATA}$-1) are sufficient for the data sequence numbers.

By using the block sequence number and the data sequence number, it is possible to designate a specific data byte. In the description below, the method of designating a specific data byte using the block sequence number and the data sequence number will be referred to as "two-dimensional addressing".

When the multiplexing/demultiplexing controller 140 requests a data block, the RLP controller 131 creates an RLP frame from the first byte in the first block, using data of proper size. The RLP controller 131 fills a block sequence number and a data sequence number of a data segment in the RLP frame so that the RLP controller of the receiving side may know to which data bytes in which block the corresponding data segment included in the received RLP frame corresponds.

When the size of the block in the RLP frame is smaller than $N_{DATA}$ bytes, the RLP controller 131 should create the RLP frame such that the RLP controller of the receiving side may know an end of the transmitted block. That is, when the transmitted data block has data of below $N_{DATA}$ bytes, the RLP controller 131 indicates the end of the block to the RLP controller of the receiving side so that the RLP controller of the receiving side should await the next block. For this, the invention defines a "block end indicator". That is, the RLP controller of the transmission side transmits a bock end indicator together with the RLP frame. The RLP controller 131 sets the 1-bit block end indicator to '1' when transmitting the last portion of a block which is smaller than $N_{DATA}$ bytes in size, and otherwise, sets the 1-bit block end indicator to '0'. Upon receipt of an RLP frame in which the block end indicator is set to 1', the RLP controller 131 await the arrival of the first data byte in the block having the next sequence number.

Figure 7:
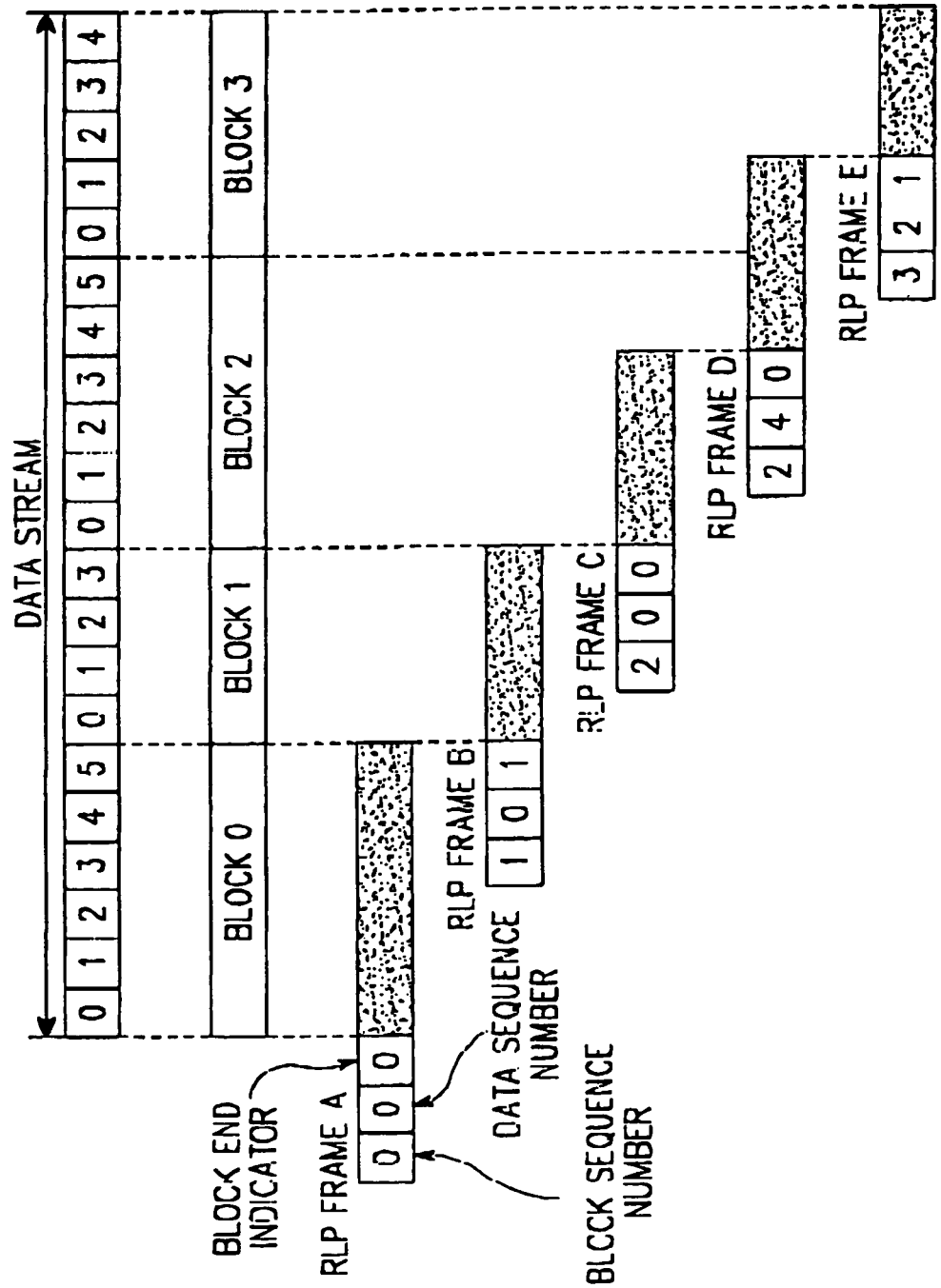
FIG. 7 is a diagram illustrating a format of a data block and an RLP frame according to an embodiment of the present invention.

This process is shown in FIG. 7, by way of example. In FIG. 7, $N_{DATA}$ is assumed to be 6. In FIG. 7, the RLP controller 131 creates, 5 RLP frames at the request of the multiplexing/demultiplexing controller 140. When the multiplexing/demultiplexing controller 140 requests a data block in which 6 data bytes can be filled, the RLP controller 131 creates the first RLP frame A shown in FIG. 7. Since a block with a sequence number 0, which is the first block, has 6-byte data, the RLP controller 131 can create the RLP frame with only BLOCK_0. Since the RLP frame is created with a data segment which starts from a data byte with a sequence number 0 in the block with the sequence number 0, the RLP controller 131 indicates the block sequence number 0 and the data sequence number 0 in the RLP frame header. Further, since the size of the block with the sequence number 0 is a predetermined size of $N_{DATA}$ bytes (6 bytes), the RLP controller 131 sets the block end indicator to '0'.

When the multiplexing/demultiplexing controller 140 requests a data block in which 4-byte data can be filled, the RLP controller 131 creates the second RLP frame B shown in FIG. 7. Since the first block has already been transmitted in FIG. 7, the RLP controller 131 creates the RLP frame using a block with a sequence number 1, which is the second block. In FIG. 7, since the block with the sequence number 1 has 4-byte data, the RLP controller 131 can create the RLP frame with only BLOCK_1. Since the RLP frame is created with a data segment which starts from a data byte with a sequence number 0 in the block with the sequence number 1, the RLP controller 131 indicates the block sequence number 1 and the data sequence number 0 in the RLP frame header. Further, since the size of the block with the sequence number 1 is 4 bytes which is less than 6 bytes and the last portion (data byte #3) of the BLOCK_1 is filled, the RLP controller 131 sets the block end indicator to '1'.

When the multiplexing/demultiplexing controller 140 requests again a data block in which 4-byte data can be filled, the RLP controller 131 creates the third RLP frame C shown in FIG. 7. Since the first and second blocks have already been transmitted in FIG. 7, the RLP controller 131 creates the RLP frame using a block with a sequence number 2, which is the third block. In FIG. 7, since the block with the sequence number 2 has 6-byte data, the RLP controller 131 creates the RLP frame with the first 4 bytes of BLOCK_2. Since the RLP frame is created with a data segment which starts from a data byte with a sequence number 0 in the block with the sequence number 2, the RLP controller 131 indicates the block sequence number 2 and the data sequence number 0 in the RLP frame header. Further, since the size of the block with the sequence number 2 is 6 bytes, the RLP controller 131 sets the block end indicator to '0'.

When the multiplexing/demultiplexing controller 140 requests again a data block in which 4-byte data can be filled, the RLP controller 131 creates the fourth RLP frame D shown in FIG. 7. Since the first 4 bytes (data byte #0 to data byte #3) in the block with the sequence number 2 have already been transmitted in FIG. 7, the RLP controller 131 creates the RLP frame beginning at the fifth data byte (data byte #4) in the block with the sequence number 2, which is the third block. In FIG. 7, since the block with the sequence number 2 has 2-byte data which is not transmitted, the RLP controller 131 cannot fill up the RLP frame with only the data in the BLOCK_2. Therefore, the RLP controller 131 creates the RLP frame using also the data in the block with a sequence number 3, which is the next block. That is, the RLP controller 131 creates the RLP frame having 4-byte data, using the last 2 bytes in the block with the sequence number 2 and the first 2 bytes in the block with the sequence number 3. Since the RLP frame is created with a data segment which starts from a data byte with a sequence number 4 in the block with the sequence number 2, the RLP controller 131 indicates the block sequence number 2 and the data sequence number 4 in the RLP frame header. Further, since the size of the block with the sequence number 2 is 6 bytes and the last portion (data byte #4) of the block with the sequence number 3 is not filled, the RLP controller 131 sets the block end indicator to '0'.

When the multiplexing/demultiplexing controller 140 requests again a data block in which 4-byte data can be filled, the RLP controller 131 creates the fifth RLP frame E shown in FIG. 7. Since the first 2 bytes (data byte #0 and data byte #1) in the block with the sequence number 3 have already been transmitted in FIG. 7, the RLP controller 131 creates the RLP frame beginning at the third data byte (data byte #2) in the block with the sequence number 3, which is the fourth block. In FIG. 7, since the block with the sequence number 3 has 3-byte data (data byte #2 to data byte #4), which is not transmitted, and has no more data, the RLP controller 131 creates the RLP frame with only the data in the BLOCK_3. That is, the RLP controller 131 creates the RLP frame having 3-byte data, using the last 3 bytes in the block with the sequence number 3. Since the RLP frame is created with a data segment which starts from a data byte with a sequence number 2 in the block with the sequence number 3, the RLP controller 131 indicates the block sequence number 3 and the data sequence number 2 in the RLP frame header. Further, since the size of the block with the sequence number 3 is 5 bytes, which is less than 6 bytes, and the last portion (data byte #4) of the block with the sequence number 3 is filled, the RLP controller 131 sets the block end indicator to '1'.

As described above, the RLP controller 131 according to the present invention segments a data stream into a plurality of RLP frames (consecutive frames) as shown in FIG. 7. The data stream is divided into a plurality of consecutive blocks BLOCK0–BLOCK 3 having a variable data length, and each consecutive block is segmented again into a plurality of sub-consecutive blocks having a byte length. For example, a consecutive block BLOCK0 is segmented into sub-consecutive blocks of 0 to 5 each having the byte length. The RLP controller 131 transmits the data stream by segmenting it into a plurality of RLP frames, wherein a header is attached at the head of each RLP frame. The header is comprised of a block sequence number, a data sequence number and a block end indicator. The block sequence number is a first set of bits indicating a unique number of the consecutive block to which the sub-consecutive blocks included in the corresponding RLP frame belong. At this point, the block sequence number is a number of the consecutive block to which the first sub-consecutive block of the corresponding RLP frame belongs. The data sequence number is a second set of bits indicating a number of the first sub-consecutive of the corresponding RLP frame. The block end indicator indicates whether the size of a consecutive block included in one or more RLP frames is smaller than a predetermined size ($N_{DATA}$ bytes) and the last portion of the block is included.

The RLP controller 131 transmits a null data block, when there is no data to transmit.

When the block is created in the above method, the RLP controller 131 fills (a sequence number of the created block, the size of the data segment included in the created block and the data segment included in the created data block) in a transmission entry and stores the transmission entry in the forward resequencing buffer 133. The forward resequencing buffer 133 keeps the retransmission entry for a predetermined time, and transmits, when the RLP controller 131 receives a retransmission request from the RLP controller of the receiving side, the retransmission entry having the requested sequence number out of the stored retransmission entries to the RLP controller 131. The RLP controller 131 creates a retransmission RLP frame to be retransmitted, using the data portion requested by the RLP controller of the receiving side out of the data segment stored in the transmitted retransmission entry. The RLP controller 131 creates the RLP frame in the same method as when creating the RLP frame which transmits new data, even when creating the retransmission RLP frame. That is, the RLP controller 131 fills a block sequence number and a data sequence number of a data segment in the RLP frame so that the RLP controller of the receiving side may know to which data bytes in which block the corresponding data segment included in the received RLP frame corresponds. In addition, when the size of the transmitted block in the RLP frame is smaller than $N_{DATA}$ bytes, the RLP controller 131 should create the RLP frame such that the RLP controller of the receiving side may know an end of the transmitted block, such as when the new data is transmitted. In addition, the RLP controller 131 should indicate to the RLP controller of the receiving side that at least the first data byte of the data segment filled in the received RLP frame is a retransmitted data byte. For this, the invention defines a "retransmit indicator". For example, the RLP controller of the transmission side sets the retransmit indicator to '1' when the first byte included in the RLP frame is a retransmitted byte, and otherwise, sets the retransmit indicator to '0'. Upon receipt of an RLP frame in which the retransmit indicator is set to '1', the RLP controller of the receiving side performs a procedure for processing the retransmitted data.

2. Data Receiving Operation of the RLP Controller

Whenever the multiplexing/demultiplexing controller 140 provides a received RLP frame, the RLP controller 131 examines whether the received RLP frame is filled with new data or retransmitted data. This operation can be performed depending on the retransmit indicator. If the retransmit indicator of the received RLP frame is set '0', it means that the RLP frame is filled with the new data, so that the RLP controller 131 examines the block sequence number and the data sequence number of the received RLP frame. If the sequence numbers are identical to the block sequence number and the data sequence number which are presently awaited, it means that there are no missing new data bytes. Therefore, the RLP controller 131 stores the received data segment in the reception data buffer 124. Otherwise, if they are not identical, the RLP controller 131 requests the RLP controller of the transmission side to retransmit the block and data corresponding to the missing sequence number, and stores the received data segment of the new block in the rearrange buffer 138.

The RLP controller 131 determines the missing sequence numbers as follows. In two-dimensional addressing, the RLP controller 131 regards the sequence numbers existing between block sequence number and the data sequence number, which were expected to be received, and the block sequence number and the data sequence number of the first byte of the received new data segment, as the missing sequence numbers. Therefore, the RLP controller 131 stores the block sequence number and the data sequence number, which were expected to be received, in the NAK list 137 as a NAK entry, and determines the block sequence number and the data sequence number of the next data byte of the data byte having the above block sequence number and the data sequence number. When the determined block sequence number and data sequence number of the next data byte are not equal to the block sequence number and the data sequence number of the first byte of the received new data segment, the RLP controller 131 stores the determined block sequence number and data sequence number in the NAK list 137 as a NAK entry, determines again the block sequence number and the data sequence number of the next data byte, and then repeats the above process. Otherwise, if the block sequence number and the data sequence number of the next data byte are equal to the block sequence number and the data sequence number of the first byte of the received new data segment, the RLP controller 131 ends the NAK entry addition process.

In two-dimensional addressing, when there is a data byte having a block sequence number B_SEQ and a data sequence number D_SEQ, a bock sequence number B_SEQNEXT and a data sequence number D_SEQNEXT of the next byte of this data byte are determined using Equation 1 below.

[Equation 1]

$$D\_SEQNEXT = D\_SEQ+1 \text{ (when } D\_SEQ \text{ is not equal to } (N_{DATA}-1)) \text{ or } 0 \text{ (when } D\_SEQ \text{ is equal to } (N_{DATA}-1)$$

$$B\_SEQNEXT = B\_SEQ+1 \text{ (when } D\_SEQ \text{ is not equal to } (N_{DATA}-1)) \text{ or } (B\_SEQ+1) \text{ modulo } N_{BLOCK} \text{ (when } D\_SEQ \text{ is equal to } (N_{DATA}-1))$$

In Equation 1, the modulo operation is performed to calculate a remainder determined by dividing a left term value of a sign 'modulo' by a right term value.

The RLP controller 131 creates a NAK entry using a block sequence number of the missing data byte, a data sequence number of the missing data byte, an indicator indicating whether the missing data byte is received, a retransmit timer and an abort timer, and stores the created NAK entry in the NAK list 137.

After finishing the NAK entry addition process for the missing data bytes, the RLP controller 131 assigns a unique block sequence number and a data sequence number to each data bytes of the data segment of the received block, using Equation 1. That is, the RLP controller 131 assigns the received block sequence number and data sequence number to the first data byte of the received data segment. Thereafter, the RLP controller 131 assigns a block sequence number and a data sequence number to the data bytes of the received data segment, using Equation 1 and the block sequence number and the data sequence number of the previous data byte.

After assigning the sequence numbers to the data bytes of the received block, the RLP controller 131 stores a resequencing buffer entry, which is comprised of a block sequence number of the received data byte, a data sequence number of the received data byte, the received data byte, and an indicator indicating whether the received data byte is the last data byte of the block, in the rearrange buffer 138, so as to rearrange (or resequence) the whole data bytes when the missing data bytes arrive. In particular, if it is informed by the RLP controller of the transmission side that the size of the received block is smaller than $N_{DATA}$ bytes and the last portion of the block in the RLP frame received this time is filled, the RLP controller 131 sets the block end indicator correspondingly when creating the resequencing buffer entry for the received last data byte.

After processing the RLP frame filled with the new data, the RLP controller 131 calculates a block sequence number and a data sequence number of the next new data, as follows.

That is, if it is informed by the RLP controller of the transmission side that the size of the received block is smaller than $N_{DATA}$ bytes and the last portion of the block in the RLP frame received this time is filled, the RLP controller 131 sets the block sequence number to a sequence number of the next new block and sets the data sequence number to '0'. As mentioned above, the sequence number of the next new block is a sequence number determined by increasing a sequence number of the previous block by one. If the previous block is assigned a sequence number of $(N_{BLOCK}-1)$, the new block will have a sequence number 0. If it is informed by the RLP controller of the transmission side that the size of the received block is equal to $N_{DATA}$ bytes and the last portion of the block, having a size smaller than $N_{DATA}$ bytes, in the RLP frame received this time is not filled, the RLP controller 131 remains the block sequence number and increases only the data sequence number as large as the size of the received data segment. If the increased data sequence number becomes larger than $N_{DATA}$, it is considered that all of the data of this block is received. Therefore, RLP controller 131 sets the blocks sequence number to a block sequence number of the next new block and sets the data sequence number to a difference between the increased data sequence number and $N_{DATA}$.

If the retransmit indicator in the received RLP frame is set to '1', the received RLP frame has a retransmitted data segment, so that the RLP controller 131 assigns a block sequence number and a data sequence number to each data byte of the data segment in the received block, using Equation 1. That is, the RLP controller 131 assigns the received block sequence number and data sequence number to the first data byte of the received data segment. Thereafter, the RLP controller 131 assigns a block sequence number and a data sequence number to each data byte of the received data segment, using Equation 1 and the block sequence number and a data sequence number of the previous data byte.

After this process, the RLP controller 131 searches the NAK list 137 for a NAK entry where the block sequence number and the data sequence number for the received data byte are consistent. If the searched NAK entry has already been received, the RLP controller 131 discards the data byte. If the searched NAK entry is the oldest one of the entries which are not received yet, it means that all of the data bytes up to the received data byte have been received. Thereafter, the RLP controller 131 rearranges the received consecutive data bytes stored in the rearrange buffer 138 in the order of the sequence number and then sends them to the reception data buffer 124, and the RPL controller 131 sets an indicator indicating whether the missing data byte is received to indicate that the missing data byte is received. If the NAK entry is not the oldest one of the entries which are not received yet, the RLP controller 131 sets an indicator indicating whether the missing data byte is received to indicate that the missing data byte is received, and stores the received data byte in the rearrange buffer 138. The RLP controller 131 creates a resequencing buffer entry comprised of a block sequence number of the received data byte, a data sequence number of the received data byte, and an indicator indicating whether the received data byte is the last data byte of the block for the data byte, and stores it in the rearrange buffer 138. When the previous missing data bytes arrives and the data frames having consecutive sequence numbers are received, the stored data is provided to the reception data buffer 124, as described above.

After processing the received RLP frame, the RLP controller 131 performs an operation of adjusting a timer for retransmission request on each NAK entry in the NAK list 137. That is, if it is determined that the received RLP frame has the newly transmitted data bytes or the RLP controller of the transmission side has transmitted nothing, it means that the RLP controller of the transmission side has no retransmission request, so that the RLP controller 131 should make the retransmission request again. Therefore, the RLP controller 131 decreases the retransmit timer or abort timer value of the NAK entry, which is not received yet, by one and makes, when this value is '0', the retransmission request again, and otherwise, transmits only the received remaining portion to the reception data buffer 124, abandoning the retransmission request.

3. Operation of the RLP Controller before Data Transmission

Before starting operation, the RLP controller 131 initializes the L_V(S) register 132, the L_V(R) register 136, the L_V(N) register 135 and the E register 134, shown in FIGS. 3 and 4, to '0'. Before starting operation, the RLP controller 131 empties the forward resequencing buffer 133, the NAK list 137 and the rearrange buffer 138. Finally, the RLP controller 131 deactivates all the retransmission-related timers.

Figure 8A:
FIGS. 8A to 8F are diagrams illustrating various frame formats used when an RLP frame generated according to an embodiment of the present invention is transmitted and received over the fundamental channel.
Figure 8B:
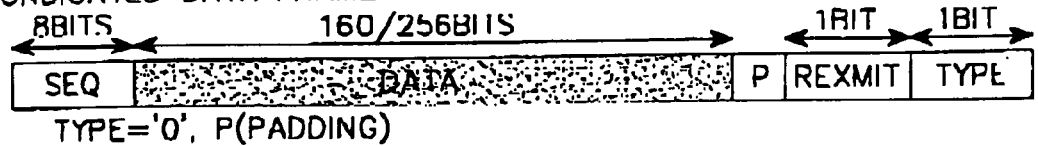
Figure 8C:
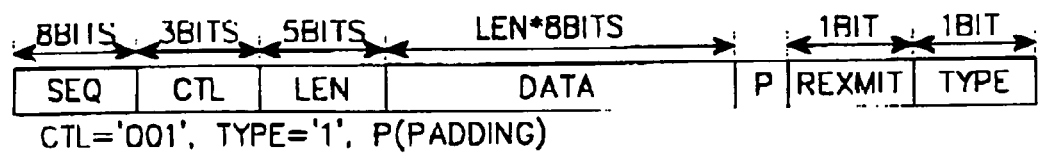
Figure 8D:
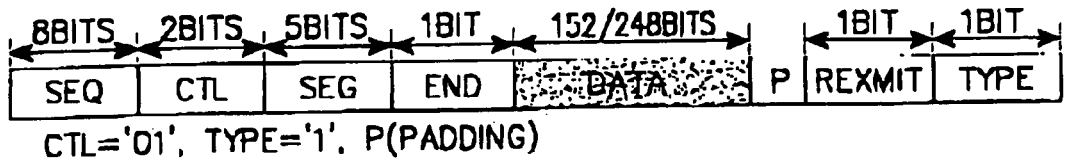
Figure 8E:
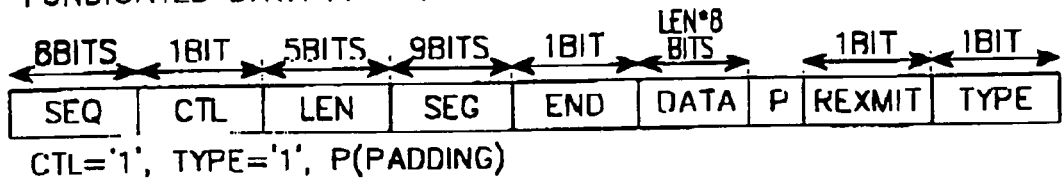
Figure 8F:
Figure 9A:
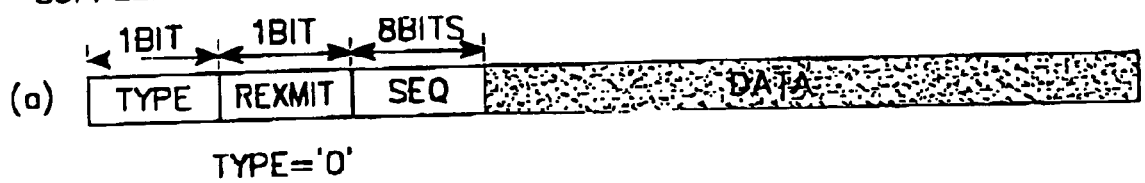
FIGS. 9A to 9B are diagrams illustrating various frame formats used when the RLP frame generated according to an embodiment of the present invention is transmitted and received over the supplemental channel.
Figure 9B:
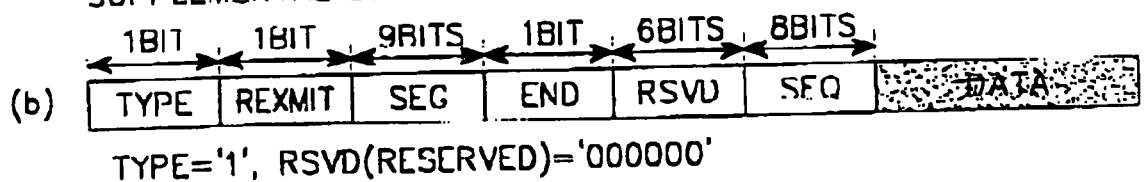

The types of the data blocks that the RLP controller 131 can transmit to the multiplexing/demultiplexing controller are shown in FIGS. 8A to 8F and FIGS. 9A to 9B. More specifically, FIGS. 8A to 8F show the RLP frames which can be transmitted over the fundamental channel, and FIGS. 9A and 9B show RLP frames which can be transmitted over the supplemental channel. In the description below, the RLP frames will be referred to as follows. The SYNC, SYNC/ACK, ACK or NAK frame shown in FIGS. 8A to 8F or Table 14 below will be referred to as a "control frame", and a frame filled with data will be referred to as a "data frame". The data frame is divided into a new data frame filled with a newly transmitted data portion and a retransmitted data frame filled with a retransmitted data portion only. A frame having only a 12-bit SEQ field will be referred to as an "idle frame".

In FIGS. 8A to 8F, the control frame, data frame or idle frame is available for a data block transmitted over the fundamental channel. In FIGS. 9A and 9B, only the data frame is available for a data block transmitted over the supplemental channel.

The RLP controller 131 performs a reestablish process before transmitting the data. The RLP controller 131 continuously transmits the SYNC frame to the multiplexing/demultiplexing controller 140 as a data block.

The RLP controller 131 receives the SYNC frame from the multiplexing/demultiplexing controller 140, and continuously transmits the SYNC/ACK frame to the multiplexing/demultiplexing controller 140 until the physical channel frame is received, which is neither a null data block nor a SYNC frame.

Upon receipt of the SYNC/ACK frame, the RLP controller 131 transmits an ACK frame to the multiplexing/demultiplexing controller 140. The RLP controller 131 continuously transmits the ACK frame until a physical channel frame, which is neither a null data block nor a SYNC/ACK frame, is received from the multiplexing/demultiplexing controller 140. The RLP controller 131 starts data transmission, when a physical channel frame is received and the received data block is not a null data block and has an RLP frame which is not a SYNC/ACK frame.

Upon receipt of the ACK frame, the RLP controller 131 starts data transmission. The RLP controller 131 can transmit other frames excepting the SYNC, SYNC/ACK, ACK frames to the multiplexing/demultiplexing controller 140.

4. FCH Data Transmitting Operation of the RLP Controller

The multiplexing/demultiplexing controller 140 of the transmission side sends a request for a data block to be transmitted over the fundamental channel to the RLP controller 131 so that the RLP controller 131 generates the frame. The multiplexing/demultiplexing controller 140 of the transmission side also sends size information T of the data block to be created by the RLP controller 131, while sending the data block request to the RLP controller 131. It will be assumed herein that the size T of the data block requested by the multiplexing/demultiplexing controller 140 of the transmission side is always 171 bits at the Rate Set 1 and 266 bits at the Rate Set 2.

The RLP controller 131 creates the data block to be transmitted over the fundamental channel according to the following priority order.

1. control frame (SYNC, SYNC/ACK, ACK, NAK)
2. retransmitted data frame
3. data frame
4. idle frame When there exists a control frame to transmit, the RLP controller 131 creates the control frame as follows. For the SYNC, SYNC/ACK and ACK frames, the RLP controller 131 sets the SEQ field to '00000000', sets the CTL field according to the frame type and then attaches an FCS field thereto, as shown in FIG. 8A. The FCS field is a 16-bit frame check sequence created by a polynomial specified by RFC-1662. The FCS field is created for all the preceding bits. The RLP controller 131 sets the portion following the FCS field to all 0's according to the size information provided from the multiplexing/demultiplexing controller 140. The RLP controller 131 sets a TYPE field which is the last one bit of the data block to '1', and then transmits the generated data block to the multiplexing/demultiplexing controller 140.

When there exists data to be retransmitted, the RLP controller 131 generates a NAK frame and transmits it to the multiplexing/demultiplexing controller. The NAK frame has a structure shown in Table 14 below.

TABLE 14

NAK frame

| Field | Length |
|---|---|
| SEQ | 8 bits |
| CTL | 8 bits |
| NAK_COUNT | 2 bits |
| The next fields are filled as many times as NAK_COUNT + 1 | |
| NAK_TYPE_AND_UNIT | 4 bits |
| When NAK_TYPE_AND_UNIT is '0001', the next fields are filled | |
| FIRST | 12 bits |
| LAST | 12 bits |
| When NAK_TYPE_AND_UNIT is '0010' or a value defined in Table 15 or 16, the next fields are filled | |
| NAK_MAP_SEQ | 12 bits |
| NAK_MAP | 8 bits |
| When NAK_TYPE_AND_UNIT is '1111', the next fields are field | |
| NAK_MAP_SEQ | 12 bits |
| FIRST | 13 bits |
| LAST | 13 bits |
| The next fields are filled for any NAK_TYPE | |
| PADDING_1 | Variable Length |
| FCS | 16 bits |
| PADDING_2 | Variable Length |
| TYPE | 1 bit |

In Table 14, the RLP controller 131 creates a NAK frame as follows. The SEQ field of Table 14 is set to '00000000', the CTL field to '00011100', and the TYPE field to '1'. The RLP controller 131 sets the NAK_COUNT field to a value determined by subtracting one from the retransmission request number included in the NAK frame.

The RLP controller 131 performs the (NAK_COUNT+1) retransmission requests. As can be appreciated from Table 14, the retransmission request is comprised of a NAK_TYPE_AND_UNIT field, and FIRST and LAST fields or NAK_MAP_SEQ and NAK_MAP fields according to the value of the NAK_TYPE_AND_UNIT field. When the NAK_TYPE_AND_UNIT field of the retransmission request is set to '0001', the RLP controller 131 fills the FIRST field with a first sequence number of the first block, which continuously requests retransmission, and fills the LAST field with a block sequence number of the last block.

When the RLP controller 131 sets the NAK_TYPE_AND_UNIT field to '0010', the retransmission request is performed on the block having a NAK_MAP_SEQ field and a NAK_MAP field in a NAK MAP method. When requesting retransmission for several nonconsecutive blocks, the RLP controller 131 sets the NAK_TYPE_AND_UNIT field to '0010' and fills the NAK_MAP field as follows. The NAK MAP method fills a block sequence number of the retransmission-requested first block in the NAK_MAP_SEQ field, and sets an nth bit from the most significant bit (MSB) of the NAK_MAP field to '1', when it is necessary to request retransmission for a block corresponding to a sequence number of (NAK_MAP_SEQ+n) modulo $2^{12}$, where n can have a value of 1 to 8. For example, for the NAK_TYPE_AND_UNIT field of '0010' and the Rate Set 1, if the NAK_MAP_SEQ field is set to '0' and the NAK_MAP field is set to '10000000', the RLP controller should retransmit a block with a block sequence number 0 and a block with a block sequence number 1 upon receipt of the field values.

The RLP controller 131 may set the NAK_TYPE_AND_UNIT field as shown in Table 15 or 16 below, when requesting retransmission for a partial portion of a block. When the RLP controller 131 sets the NAK_TYPE AND_UNIT field as shown in Table 15 or 16, the transmission request is performed on a partial portion of a block having the NAK_MAP_SEQ field and the NAK_MAP field in a NAK_MAP method.

TABLE 15

NAK_TYPE_AND_UNIT field (Rate Set 1)

| Field Value | Number of Sequence Number |
|---|---|
| '0011' | 19 |
| '0100' | 41 |
| '0101' | 42 |
| '0110' | 90 |
| '0111' | 186 |
| '1000' | 378 |
| '1001' | 762 |
| '1010' | 1530 |

TABLE 16

NAK_TYPE_AND_UNIT field (Rate Set 2)

| Field Value | Number of Sequence Number |
|---|---|
| '0011' | 31 |
| '0100' | 65 |
| '0101' | 66 |
| '0110' | 138 |
| '0111' | 282 |
| '1000' | 318 |
| '1001' | 570 |
| '1010' | 1146 |
| '1011' | 2586 |

The RLP controller 131 fills the NAK_MAP field and NAK_MAP SEQ field based on Table 15 or 16. A block sequence number of the retransmission-requested block is filled in the NAK_MAP_SEQ field, and a data sequence number of the data segment in a block requested to be retransmitted in the unit shown in Table 15 or 16 is filled in the NAK_MAP field. By using the NAK_MAP, the RLP controller 131 requests retransmission for the data byte belonging to the blocks corresponding to the data sequence numbers of $(n-1)*U$ to $(n*U-1)$ where U denotes the unit determined by the NAK_TYPE_AND_UNIT field, whenever an nth bit from the most significant bit (MSB) of the NAK_MAP field is '1'. The value 'n' can have a value of 1 to 8. For example, for Rate Set 1, when the NAK_TYPE_AND_UNIT field is set to '0011', the NAK_MAP_SEQ field is set to '0' and the NAK_MAP field is set to '10000000', the RLP controller should retransmit the data bytes of the data sequence numbers 0 to 18 in a data portion of the block with a block sequence number 0, i.e., the $1^{st}$ to $19^{th}$ data bytes upon receipt of the field values.

The RLP controller 131 may set the NAK_TYPE_AND_UNIT field to '1111', when requesting retransmission for the data bytes belonging to the block. When the RLP controller 131 sets the NAK_TYPE_AND_UNIT field to '1111', the retransmission request contains the NAK_MAP_SEQ field, the FIRST field and the LAST field. The RLP controller 131 fills a block sequence number of the block filled with the retransmission-requested data segment in the NAK_MAP_SEQ field, fills a data sequence number of the first byte of the retransmission-requested data segment in the FIRST field and fills a data sequence number of the last byte in the LAST field.

The RLP controller 131 creates the (NAK_COUNT+1) transmission requests to fill them in the NAK frame, pads the FCS field with 0's for byte alignment and then fills the FCS field. The FCS field is a 16-bit frame check sequence created by a polynomial specified in RFC-1662. The FCS field is created for all the preceding bits. After filling the FCS field, the RLP controller 131 fills the remaining portion of the data block with 0's.

To create a new data frame to be transmitted over the fundamental channel, the RLP controller 131 operates as follows.

After transmitting all the data bytes in the block which was defined previously or defined when the new data frame was first created, the RLP controller 131 defines a new block for the remaining data of the data stream. Herein, a method for defining a new block will be divided into a mode A and a mode B. In the mode A, the new block is defined so as to have data segments as large as the data size which can be filled in the data block requested by the multiplexing/ demultiplexing controller 140. In the mode B, the new block is defined so as to always have $N_{DATA}$ bytes regardless of the size of the data block requested by the multiplexing/demultiplexing controller 140. When defining the new block, the RLP controller 131 may select the mode A or the mode B. In the embodiment, $N_{BLOCK}$ and $N_{DATA}$ are defined as $2^8$ and $2^9$, respectively.

FIGS. 8A to 8F show available formats which can be transmitted over the fundamental channel. FIG. 8A shows a transmission format of a control frame such as SYNC, SYCN/ACK, and ACK frames. FIGS. 8B to 8E shows a transmission format of a data frame. Finally, FIG. 8F shows a transmission format of an idle frame. The structure of each transmission format will become apparent from the description below.

When creating a fundamental channel RLP frame filled with the new data, the RLP controller 131 uses the 21-bit sequence number register L_V(S) 132. The RLP controller 131 defines 12 high bits out of the 21-bit value of the sequence number register L_V(S) 132 as a block sequence number B_SEQ, and defines 9 low bits as a data sequence number D_SEQ.

If the D_SEQ value is not 0, the RLP controller 131 decides that the block has a data portion which is not yet transmitted. That is, the RLP controller 131 decides that the data bytes having data sequence numbers of D_SEQ to ($N_{DATA}-1$) in a block corresponding to the block sequence number B_SEQ should be transmitted. Therefore, to transmit the data segment, the RLP controller 131 uses the frame formats of FIGS. 8D and 8E. The format of FIG. 8D can be used when the following conditions are satisfied.

First, the number of the data bytes in the data stream, which are not transmitted yet, is over B which can be transmitted with the format of FIG. 8D, i.e., is 19 bytes or over at the Rate Set 1 and 31 bytes or over at the Rate Set 2.

Second, the D_SEQ value is a multiple of the number B of the data bytes which can be transmitted with the format of FIG. 8D, i.e., a multiple of 19 at the Rate Set 1 and a multiple of 31 at the Rate Set 2.

When transmitting the new data using the format of FIG. 8D, the RLP controller 131 first sets the SEQ field with the 8 low bits of the B_SEQ value which is the block sequence number of the data portion. Further, the RLP controller 131 sets a SEG field with a quotient determined by dividing the D_SEQ value by the number B of the data bytes transmitted with the format of FIG. 8D.

When transmitting the new data using the format of FIG. 8D, the RLP controller 131 sets a TYPE field to '1', a REXMIT field, which is the retransmit indicator, to '0' and a CTL field to '01' and then fills a DATA field with transmission data.

When transmitting the new data using the format of FIG. 8E, the RLP controller 131 first sets the SEQ field with the 8 low bits of the B_SEQ value which is a block sequence number of the data portion. Further, the RLP controller 131 sets the SEG field with the D_SEQ value.

When transmitting the new data using the format of FIG. 8E, the RLP controller 131 sets the TYPE field to '1', the REXMIT field, which is the retransmit indicator, to '0' and the CTL field to '1', fills the DATA field with the transmission data, and then sets the LEN field to the number of data bytes filled in the DATA field.

When transmitting the new data using the format of FIG. 8D or 8E, the RLP controller 131 sets the END field, which is the block end indicator, to '1' when the following conditions are satisfied, and otherwise, sets the END field to '0'.

First, after transmission, the data stream has no more data which has not yet been transmitted.

Second, a value determined by adding the number N of the transmitted data bytes to the D_SEQ value is not equal to $N_{DATA}$ or a multiple of it.

After transmitting the new data frame, the RLP controller 131 updates the L_V(S) register 132 as follows. First, when the END field, which is the block end indicator, is set to '0', if the size of new data transmitted is N in the above process, the RLP controller 131 adds the N value to the L_V(S) register 132. Second, when the END field, which is the block end indicator is set to '1' in the above process, the RLP controller 131 adds '1' to the value of the upper 12 bits of the L_V(S) register 132, and set the value of the lower 9 bits of the L_V(S) register 132 to '0'.

The RLP controller 131 defines a new block when the D_SEQ value is 0. As described above, this operation has the different procedures for the mode A and the mode B. If the RLP controller 131 defines the new block according to the mode B, the RLP controller 131 will operate as follows.

In the mode A, the RLP controller 131 decides the minimum value M out of the size of the new block to the number B of the data bytes which can be transmitted with the format of FIG. 8B, i.e., 20 bytes at the Rate Set 1 and 32 bytes at the Rate Set 2, and the number of the data bytes in the data stream, which have not yet been transmitted. The RLP controller 131 uses the format of FIG. 8B when the determined minimum value M is equal to the number B of the data bytes which can be transmitted with the format of FIG. 8B, and otherwise, uses the format of FIG. 8C.

When transmitting the new data using the format of FIG. 8B, the RLP controller 131 first sets the SEQ field with the 8 low bits of the B_SEQ value which is a block sequence number of the data portion. Since the data transmitted with the format of FIG. 8B always starts from a data sequence number 0 and has a size smaller than $N_{DATA}$, the block end indicator is always set to '1'. Therefore, although the format of FIG. 8B does not include the data sequence number and the block end indicator, the RLP controller of the receiving side recognizes the data sequence number as '0' and the block end indicator as '1' upon receipt of the format of FIG. 8B.

When transmitting the new data using the format of FIG. 8B, the RLP controller 131 sets the TYPE field to '0', the REXMIT field, which is the retransmit indicator, to '0', and then fills the DATA field with the transmission data.

When transmitting the new data using the format of FIG. 8C, the RLP controller 131 first sets the SEQ field with the 8 low bits of the B_SEQ value which is the block sequence number of the data portion. Since the data transmitted with the format of FIG. 8C always starts from a data sequence number 0 and has a size smaller than $N_{DATA}$, the block end indicator is always set to '1'. Therefore, although the format of FIG. 8C does not include the data sequence number and the block end indicator, the RLP controller of the receiving side recognizes the data sequence number as '0' and the block end indicator as '1' upon receipt of the format of FIG. 8C.

When transmitting the new data using the format of FIG. 8C, the RLP controller 131 sets the TYPE field to '1', the REXMIT field, which is the retransmit indicator, to '0', and the CTL field to '001', fills the DATA field with the transmission data, and then sets the LEN field to the number of the data bytes filled in the DATA field.

After transmitting the new data frame, the RLP controller 131 updates the L__V(S) register 132 as follows. The RLP controller 131 adds the $N_{DATA}$ value to the L__V(S) register 132.

If the RLP controller 131 defines the new block according to the mode B, the RLP controller 131 operates as follows. In the mode B, the RLP controller 131 sets the size of the new block to the minimum value M out of the $N_{DATA}$ bytes and the number of the data bytes in the data stream, which are not transmitted yet. After determining the size of the new block, the RLP controller 131 defines the new block as having the data as large as the block size determined from the data bytes in the data stream, which have not yet been transmitted. After defining the new block, the RLP controller 131 performs the procedure for transmitting the remaining portion of the block, as described above.

The RLP controller 131 stores the newly defined blocks in the forward resequencing buffer 133, preparing for a retransmission request from the receiving side. The RLP controller 131 fills a block sequence number of the generated block, a size of the data segment included in the generated block, and the data segment included in the generated block in a retransmission entry and stores it in the forward resequencing buffer 133. Upon receipt of a retransmission request from the receiving side, the RLP controller 131 should detect a data byte corresponding to the requested block sequence number and data sequence number from the forward resequencing buffer 133, and retransmit the detected data byte. The RLP controller 131 determines the retransmission-requested block sequence number as a block sequence number B__SEQ and determines the data sequence number of the first byte in the transmission data segment as a data sequence number D__SEQ.

The RLP controller 131 may use the formats of FIGS. 8B to 8E, when transmitting the retransmitted data frame. The RLP controller 131 uses the formats of FIG. 8B or 8C, when the following conditions are satisfied.

First, a retransmission request is made for the whole block.

Second, the size of the retransmission block is equal to or smaller than the number B of the data bytes which can be transmitted with the format of FIG. B, i.e., 20 bytes at the Rate Set 1 and 32 bytes at the Rate Set 2.

In retransmitting the block using the format of FIG. 8B or 8C, the RLP controller 131 uses the format of FIG. 8B if the block size is equal to the number B of the data bytes which can be transmitted with the format of FIG. 8B, and otherwise, uses the format of FIG. 8C.

When retransmitting the block using the format of FIG. 8B, the RLP controller 131 first sets the SEQ field with the 8 low bits of the block sequence number B__SEQ of the data portion.

When retransmitting the block using the format of FIG. 8B, the RLP controller 131 sets the TYPE field to '0' and the REXMIT field to '1', and then fills the DATA field with the retransmission data.

When retransmitting the block using the format of FIG. 8C, the RLP controller 131 first sets the SEQ field with the 8 low bits of the block sequence number B__SEQ of the data portion.

When retransmitting the block using the format of FIG. 8C, the RLP controller 131 sets the TYPE field to '1', the REXMIT field to '1' and the CTL field to '001', fills the DATA field with the retransmission data, and then fills the LEN field with the number of the data bytes filled in the DATA field.

When the above conditions are not satisfied, the RLP controller 131 uses the format of FIG. 8D or 8E. The RLP controller 131 may use the format of FIG. 8D, when the following conditions are satisfied.

First, the size of the data segment in the retransmission block is over the number B of the data bytes which can be transmitted with the format of FIG. 8D, i.e., 19 bytes or over at the Rate Set 1 and 31 bytes or over at the Rate Set 2.

Second, a data sequence number D__SEQ of the first data byte of the data segment in the retransmission block is a multiple of the number B of the data bytes which can be transmitted with the format of FIG. 8D, i.e., a multiple of 19 at the Rate Set 1 and a multiple of 31 at the Rate Set 2.

When retransmitting the data segment in the bock using the format of FIG. 8D, the RLP controller 131 first sets the SEQ field with the 8 low bits of the block sequence number B__SEQ of the data portion. Further, the RLP controller 131 sets the SEG field with a quotient determined by dividing the D__SEQ value by the number B of the data bytes which are transmitted with the format of FIG. 8D.

When retransmitting the data segment in the block using the format of FIG. 8D, the RLP controller 131 sets the TYPE field to '1', the REXMIT field to '1' and the CTL field to '01', and then fills the DATA field with the retransmission data.

When retransmitting the data segment in the block using the format of FIG. 8E, the RLP controller 131 first sets the SEQ field with the 8 low bits of the block sequence number B__SEQ of the data portion. Further, the RLP controller 131 sets the SEG field with the D__SEQ value.

When retransmitting the data segment in the block using the format of FIG. 8E, the RLP controller 131 sets the TYPE field to '1', the REXMIT field to '1' and the CTL field to '1', fills the DATA field with the retransmission data, and then fills the LEN field with the number of the data bytes filled in the DATA field.

In retransmitting the data using the format of FIG. 8D or 8E, the RLP controller 131 sets the END field, which is the block end indicator, to '1' if the following conditions are satisfied, and otherwise, sets the END field to '0'.

First, after transmission, the data segment in the block has no more data which has not yet been retransmitted.

Second, a value determined by adding the number N of the transmitted data bytes to the D__SEQ is not equal to $N_{DATA}$ or a multiple of it.

The RLP controller 131 may transmit an idle frame in the format of FIG. 8F, when the multiplexing/demultiplexing controller 140 requests a data block having a length of 16, 20 or 32 bits, and when there is no new transmission data or no retransmission data and there no control frame to transmit. To assemble the idle frame, the RLP controller 131 fills the SEQ field with 12 high bits of the L__V(S) register 132. The RLP controller 131 transmits the data block, a remaining portion of which is filled with 0's, to the multiplexing/demultiplexing controller 140.

5. FCH Data Receiving Operation of the RLP Controller

The multiplexing/demultiplexing controller 140 provides the RLP controller 131 with the data block together with size information T of the received data block.

Upon receipt of the SYNC, SYCN/ACK and ACK frames out of the control frames, the RLP controller 131 performs the reestablish process. Upon receipt of the NAK frame out of the control frame, the RLP controller 131 analyzes the NAK frame according to Table 14 to retransmit a requested block or data segments of the block.

The RLP controller 131 uses the 21-bit sequence number register L__V(R) 136 when a new data frame in the formats of FIGS. 8B to 8E is received. The RLP controller 131 determines the 12 high bits of the 21-bit value from the sequence number register L__V(R) 136 as a block sequence number B__SEQR waiting to be transmitted, and the 9 low bits as a data sequence number D__SEQR waiting to be transmitted. First, the RLP controller 131 calculates the block sequence number B__SEQ using the 8-bit SEQ field of the received frame and the L__V(R) register 136, in accordance with Equation 2 below.

[Equation 2]

$$B\_SEQ=[B\_SEQR+\{2^8+SEQ-(B\_SEQR \text{ modulo } 2^8)\} \text{ modulo } 2^8] \text{ modulo } 2^{12} \quad \ldots (2)$$

The RLP controller 131 determines the data sequence number of the first data byte in the received data segment as '0', upon receipt of the new data frame in the format of FIG. 8B or 8C. The RLP controller 131 regards the END field which is the block end indicator as '1', upon receipt of the new data frame in the format of FIG. 8B or 8C.

Upon receipt of the new data frame in the format of FIG. 8D, the RLP controller 131 determines the data sequence number D__SEQ of the first data byte in the received data segment as a value determined by multiplying the 5-bit SEG field value of the received frame by the number B of the data bytes which can be transmitted with the format of FIG. 8D.

Upon receipt of the new data frame in the format of FIG. 8E, the RLP controller 131 determines the data sequence number D__SEQ of the first data byte in the received data segment as the 9-bit SEG value of the received frame.

The RLP controller 131 determines the END field value as a 1-bit END field value of the received frame, upon receipt of the new data frame in the format of FIG. 8D or 8E.

When receipt of the retransmitted data frame in the format of FIGS. 8B to 8E, the RLP controller 131 should have the NAK list 137 shown in FIG. 4. As stated above, each NAK entry in the NAK list 137 is comprised of a block sequence number of the missing data byte, a data sequence number of the missing data byte, an indicator indicating whether the missing data byte is received, a retransmit timer and an abort timer. The RLP controller 131 detects a NAK entry where the 8 low bits of the 12-bit block sequence number value are consistent with a value filled in the 8-bit SEQ field of the received retransmitted frame. If there is a detected NAK entry, the RLP controller 131 determines the block sequence number B__SEQ stored in the NAK entry as a block sequence number of the received data segment. Otherwise, if there is no detected NAK entry, the RLP controller 131 discards the received frame.

Upon receipt of the retransmitted data frame in the format of FIG. 8B or 8C, the RLP controller 131 determines the data sequence number D__SEQ of the first data byte in the received data segment as '0'.

The RLP controller 131 determines the END field value as '1', upon receipt of the retransmitted data frame in the format of FIG. 8B or 8C.

Upon receipt of the retransmitted data frame in the format of FIG. 8D, the RLP controller 131 determines the data sequence number D__SEQ of the first data byte in the received data segment as a value determined by multiplying the 5-bit SEG field value of the received frame by the number B of the data bytes which can be transmitted with the format of FIG. 8D.

Upon receipt of the retransmitted data frame in the format of FIG. 8E, the RLP controller 131 determines the data sequence number D__SEQ of the first data byte in the received data segment as a 9-bit SEG field value of the received frame.

Upon receipt of the retransmitted data frame in the format of FIG. 8D or 8E, the RLP controller 131 determines the EDN field value as a 1-bit END field value of the received frame.

Upon receipt of the formats shown in FIGS. 8B to 8E, the RLP controller 131 sets the data sequence number of the first data byte in the received data segment to the D__SEQ field value determined in the above process. After determining the block sequence number B__SEQ and the data sequence number D__SEQ of the first data byte in the received data segment, the RLP controller 131 calculates the sequence numbers of the remaining data bytes using Equation 1.

The RLP controller 131 uses the L__V(N) register 135 which is a 21-bit sequence number register when processing the data bytes in the received data segment. The RLP controller 131 determines the 12 high bits of the 21-bit value from the sequence number register L__V(N) 135 as a block sequence number B__SEQN waiting to be retransmitted, and determines the 9 low bits as a data sequence number D__SEQN waiting to be retransmitted. The RLP controller 131 decides the block sequence numbers and the data sequence numbers of the respective data bytes in the received data segment, based on Table 17 below.

TABLE 17

| Case | Decision |
|---|---|
| Case 1 | For two pairs, <B1,D1> and <B2,D2>, of block sequence numbers and data sequence numbers, when B1 = B2 and D1 = D2, <B1,D1> is equal to <B2,D2>. |
| Case 2 | If B2 is one of the sequence numbers of (B1 + $N_{BLOCK}$/2) modulo $N_{BLOCK}$ to (B1 + $N_{BLOCK}$ − 1) modulo $N_{BLOCK}$, <B1,D1> is larger than <B2,D2>. |
| Case 3 | If B1 = B2 and D2 is one of the sequence numbers of (D1 + $N_{DATA}$/2) modulo $N_{DATA}$ to (D1 + $N_{DATA}$ − 1) modulo $N_{DATA}$, <B1,D1> is larger than <B2,D2>. |
| Case 4 | If <B1,D1> is not equal to and not larger than <B2,D2>, <B1,D1> is smaller than <B2,D2>. |

The RLP controller 131 compares a pair <B,D> of the block sequence number and the data sequence number of each data byte in the received data segment with <B__SEQR, D__SEQR> and <R__SEQN, D__SEQN> using Table 17, as follows. Here, SEQR is a 21-bit sequence number value stored in the L__V(R) register 136 which stores the next expected block sequence numbers and data sequence numbers: B__SEQR is a sequence number of the 12 high bits of the SEQR, and D__SEQR is a sequence number of the 9 low bits of the SEQR. SEQN is a 21-bit sequence number value stored in the L__V(N) register 135 which stores the block sequence numbers and the data sequence numbers which should be retransmitted first: B__SEQN is a sequence number of the 12 high bits of the SEQN, and D__SEQN is a sequence number of the 9 low bits of the SEQN.

First, if <B,D> is equal to or larger than <B__SEQN, D__SEQN> and is smaller than <B__SEQR, D__SEQR>, the RLP controller 131 regards this as retransmitted data.

Second, if <B,D> is equal to larger than <B__SEQR, D__SEQR> and a B value is smaller than a value determined by performing modulo $2^8$ operation on a value determined by adding B__SEQR to the E register 134, the RLP controller 131 regards this as new data.

Third, if <B,D> is equal to or larger than a value determined by performing modulo $2^8$ operation on a value determined by adding <B__SEQR, D__SEQR> to the E register 134, the RLP controller 131 regards this as duplicated data.

The RLP controller 131 discards the data byte regarded as the duplicated data, since it is the previously received data.

If the received data byte is regarded as a new data byte or a retransmitted data byte, the RLP controller 131 performs the following operations.

First, if <B,D> of the received data byte is larger than or equal to <B_SEQN, D_SEQN> and is smaller than <B_SEQR, D_SEQR>, the RLP controller 131 creates a resequencing buffer entry comprised of a block sequence number of the received data byte, a data sequence number of the received data byte, the received data byte, and an indicator indicating whether the received data byte is the last data byte in the block and stores the received data byte in the rearrange buffer 138. The indicator indicating whether the received data byte is the last data byte in the block is set to indicate 'LAST', when the data byte is the last data byte of the received data segment and the END value is set to '1'. At this point, if <B,D> is equal to <B_SEQN, D_SEQN>, the RLP controller 131 sequentially transmits to the reception data buffer the stored data bytes from the resequencing buffer entry having a sequence number <B_SEQ, D_SEQN> to the resequencing buffer entry having a sequence number which can be consecutively transmitted, out of the resequencing buffer entries stored in the rearrange buffer 138. If the indicator indicating whether a received data byte of a resequencing buffer entry, to 15 which the last transmitted data byte belongs, is the last data byte of a block is set to a value indicating the last byte, the RLP controller 131 sets the 12 high bits of the L_V(N) register 135 to the next block sequence number of the block sequence number stored in the resequencing buffer entry and sets the 9 low bits to '0'. Otherwise, if the indicator is not set to indicate the last byte, the RLP controller 131 sets <B_SEQN, D_SEQN> to indicate the next data byte of the last transmitted data byte using Table 1, and then sets the 12 high bits and the 9 low bits of the L_V(N) register 135 to the B_SEQN value and the D_SEQN value, respectively. The RLP controller 131 records the fact that the awaited data frame is received at the NAK entry having the same block sequence number and data sequence number as those of the received data byte.

Second, if <B,D> of the received data byte is equal to <B_SEQR, D_SEQR> and <B_SEQR, D_SEQR> is equal to <B_SEQN, D_SEQN>, the RLP controller 131 increases both <B_SEQR, D_SEQR> and <B_SEQN, D_SEQN> to indicate the next byte using Equation 1. At this point, if the data byte is the last data byte of the received data segment and the END value is set to '1', the RLP controller 131 sets the 12 high bits of the L_V(N) register 135 to the next block sequence number of the B_SEQN value and the 9 low bits to '0', and similarly, sets the 12 high bits of the L_V(R) register 136 to the next block sequence number of the B_SEQR value and the 9 low bits to '0'. Otherwise, the RLP controller 131 sets the 12 high bits and the 9 low bits of the L_V(N) register 135 to the B_SEQN value and the D_SEQB value, respectively, and sets the 12 high bits and the 9 low bits of the L_V(R) register 136 to the B_SEQR value and the D_SEQR value, respectively. The RLP controller 131 provides the received data byte to the reception data buffer.

Third, if <B,D> of the received data byte is equal to <B_SEQR, D_SEQR> and <B_SEQR, D_SEQR> is not equal to <B_SEQN, D_SEQN>, the RLP controller 131 increases <B_SEQR, D_SEQR> to indicate the next byte using Equation 1. At this point, if the data byte is the last data byte of the received data segment and the END value is set to '1', the RLP controller 131 sets the 12 high bits of the L_V(R) register 136 to the next block sequence number of the B_SEQR value and the 9 low bits to '0'. Otherwise, the RLP controller 131 sets the 12 high bits and the 9 low bits of the L_V(R) register 136 to the B_SEQR value and the D_SEQR value, respectively. In this case, the RLP controller 131 creates the received data byte into the resequencing buffer entry comprised of a block sequence number of the received data byte, a data sequence number of the received data byte, the received data byte, and an indicator indicating whether the received data byte is the last data byte in the block and stores the received data byte in the rearrange buffer 138. The indicator indicating whether the received data byte is the last data byte in the block is set to indicate 'LAST', when the data byte is the last data byte of the received data segment and the END value is set to '1'.

Fourth, if <B,D> of the received data byte is larger than <B_SEQR, D_SEQR>, the RLP controller 131 creates an entry for each data byte in the NAK list 137, in order to request retransmission of the data bytes of <B_SEQR, D_SEQR> to the previous data byte of <B,D>. As stated above, each entry is comprised of a block sequence number of the missing data byte, a data sequence number of the missing data byte, an indicator indicating whether the missing data byte is received, a retransmit timer and an abort timer. Further, the RLP controller 131 stores the received data byte in the rearrange buffer 138, and increases <B_SEQR, D_SEQR> to indicate the next data byte using Equation 1. If the data byte is the last data byte of the received data segment and the END value is set to '1', the RLP controller 131 sets the 12 high bits of the L_V(R) register 136 to the next block sequence number of the B_SEQR value and sets the 9 low bits to '0'. Otherwise, the RLP controller 131 sets the 12 high bits and the 9 low bits of the L_V(R) register 136 to the B_SEQR value and the D_SEQR value, respectively.

Meanwhile, upon receipt of the idle frame in the format of FIG. 8F, the RLP controller 131 sets the block sequence number B_SEQ to the 12-bit SEQ field value and sets the data sequence number D_SEQ to '0'. If <B_SEQ, D_SEQ> of the received idle frame is larger than <B_SEQR, D_SEQR>, the RLP controller 131 creates an entry for each data byte in the NAK list 137, in order to request retransmission of the previous data bytes of <B_SEQR, D_SEQR> to the previous data byte of <B_SEQ, D_SEQ>. As stated above, each entry is comprised of a block sequence number of the missing data byte, a data sequence number of the missing data byte, an indicator indicating whether the missing data byte is received, a retransmit timer and an abort timer. Further, the RLP controller 131 sets the 12 high bits of the L_V(R) register 136 to the next block sequence number of the B_SEQR value and sets the 9 low bits to '0'. If <B_SEQ, D_SEQ> of the received idle frame is smaller than <B_SEQR, D_SEQR>, the RLP controller 131 performs the reestablish process.

If the RLP controller 131 is informed by the multiplexing/demultiplexing controller that a damaged data block is received, the RLP controller 131 increases the value stored in the E register 134 by one and stores the resulting value in the E register 134. If a value determined by performing modulo $2^8$ operation on a value determined by adding the increased value of the E register 134 to the B_SEQR value is larger than the B_SEQN value, the RLP controller 131 performs the reestablish process.

If there is any data block which is received correctly and is not a null data block or if the RLP controller 131 is informed by the multiplexing/demultiplexing controller that no frame is received, the RLP controller 131 sets the E register 134 to '0'.

6. SCH Data Transmitting Operation of the RLP Controller

The multiplexing/demultiplexing controller 140 of the transmission side sends a request for a data block to be transmitted over the supplemental channel to the RLP controller 131 so that the RLP controller 131 generates the frame. The multiplexing/demultiplexing controller 140 of the transmission side also sends the RLP controller 131 the size information T of the data block that the RLP controller 131 should create.

The RLP controller 131 creates the data block to be transmitted over the supplemental channel according to the following priority order.

1. retransmission data frame
2. data frame

The RLP controller 131 creates a new data frame to be transmitted over the supplemental channel, as follows.

When a new data frame is first created or when all the data bytes in the previously defined block have been transmitted, the RLP controller 131 defines a new block for the remaining data of the data stream. Herein, as in the fundamental channel, a method for defining a new block will be divided into a mode A and a mode B. In the mode A, the new block is defined so as to have data segments as large as the data size which can be filled in the data block requested by the multiplexing/demultiplexing controller 140. In the mode B, the new block is defined so as to always have $N_{DATA}$ bytes regardless of the size of the data block requested by the multiplexing/demultiplexing controller 140. When defining the new block, the RLP controller 131 may select the mode A or the mode B.

FIGS. 9A and 9B show frame formats which can be transmitted over the supplemental channel in the modes A and B. A new data frame created in the mode B can have the format of FIG. 9A. A new data frame created in the mode A can have the format of FIG. 9B. When creating a supplemental channel RLP frame filled with a new data frame, the RLP controller 131 uses the 21-bit sequence number register L_V(S) 132. The RLP controller 131 determines the 12 high bits of the 21-bit value from the sequence number register L_V(S) 132 as a block sequence number B_SEQ, and determines the 9 low bits as a data sequence number D_SEQ.

Referring to FIG. 9A, the data frame which can be transmitted over the supplemental channel is comprised of a 1-bit TYPE field, a 1-bit REXMIT (retransmit indicator) field, an 8-bit SEQ (sequence number) field, and a DATA field.

Referring to FIG. 9B, the data frame which can be transmitted over the supplemental channel is comprised of a 1-bit TYPE field, a 1-bit REXMIT field, a 9-bit SEG (data sequence number) field, a 1-bit END (block end indicator) field, a 6-bit RSVD (reserved) field, an 8-bit SEQ field, and a DATA field.

If the determined D_SEQ value is not '0', the RLP controller 131 decides that the block has a data portion which has not yet been transmitted. That is, the RLP contorller131 decides that the data bytes of the data sequence numbers of D_SEQ to ($N_{DATA}$-1) in the block corresponding to the block sequence number B_SEQ should be transmitted. Therefore, the RLP controller 131 uses the format of FIG. 9B to transmit the data segments.

When transmitting the new data using the format of FIG. 9B, the RLP controller 131 first sets the SEQ field with the 8 low bits of the block sequence number B_SEQ of the data portion. Further, the RLP controller 131 sets the SEG field to the D_SEQ value.

When transmitting the new data using the format of FIG. 9B, the RLP controller 131 sets the TYPE field to '1' and the REXMIT field to '0', and then fills the DATA field with the retransmission data.

When transmitting the new data using the format of FIG. 9B, the RLP controller 131 sets the END field, which is the block end indicator, to '1' if the following conditions are satisfied, and otherwise, set the END field to '0'.

First, after transmission, there remains no more transmission data in the data stream.

Second, a value determined by adding the number N of the transmitted data bytes to the D_SEQ value is not equal to $N_{DATA}$ or a multiple of it.

After transmission of the new data, the RLP controller 131 updates the L_V(S) register 132. If the size of the transmitted new data is N, the RLP controller 131 adds the N value to the value of the L_V(S) register 132 as follows.

First, when the END field, which is the block end indicator, is set to '0' in the above process, if the size of new data transmitted is N, the RLP controller 131 adds the N value to the L_V(s) register 132.

Second, when the END field, which is the block end indicator, is set to '1' in the above process, the RLP controller 131 adds '1' to the value of the upper 12 bits of the L_V(s) register 132, and sets the value of the lower 9 bits of the L_V(s) register 132 to '0'.

If the D_SEQ value is 0, the RLP controller 131 defines a new block. As stated above, this operation is performed differently in the mode A and the mode B. If the RLP controller 131 defines the new block according to the mode B, the RLP controller 131 will operate as follows.

In the mode B, the RLP controller 131 determines the size of the new block as a minimum value M out of the number of the data bytes which can be transmitted with the format of FIG. 9A, i.e., and the number of the data bytes in the data stream, which have not yet been transmitted.

When transmitting the new data using the format of FIG. 9A, the RLP controller 131 first sets the SEQ field with the 8 low bits of the block sequence number B_SEQ of the data portion. Since the data transmitted with the format of FIG. 9A always starts from a data sequence number 0 and has a size smaller than $N_{DATA}$, the block end indicator is always set to '1'. Therefore, although the format of FIG. 9A does not include the data sequence number and the block end indicator, the RLP controller of the receiving side recognizes the data sequence number as '0' and the block end indicator as '1' upon receipt of the format of FIG. 9A.

When transmitting the new data using the format of FIG. 9A, the RLP controller 131 sets the TYPE field to '0', the REXMIT field, which is the retransmit indicator, to '0', and then fills the DATA field with the transmission data.

After transmission of the new data, the RLP controller 131 updates the L_V(S) register 132 as follows. The RLP controller 131 adds the $N_{DATA}$ value to the value of the L_V(S) register 132.

If the RLP controller 131 defines the new block according to the mode B, the RLP controller 131 will operate as follows. In the mode B, the RLP controller 131 determines the size of the new block as the minimum value M out of $N_{DATA}$ bytes and the number of the data bytes in the data stream, which have not yet been transmitted. After determining the size of the new block, the RLP controller 131 defines the new block as having the data as large as the block size determined from the data bytes in the data stream, which have not yet been transmitted. After defining the new block, the RLP controller 131 performs the procedure for transmitting the remaining portion of the block, as described above.

The RLP controller 131 stores the newly defined blocks in the forward resequencing buffer 133, preparing for a retransmission request from the receiving side.

The RLP controller 131 can use the format of FIG. 9A or 9B when transmitting a retransmission data frame. The RLP controller 131 uses the format of FIG. 9A when the following conditions are satisfied.

First, a retransmission request is made for the whole block.

Second, the size of the retransmission block is equal to or smaller than the number B of the data bytes which can be transmitted with the format of FIG. 9A, i.e., a value determined by subtracting 10 bits of the RLP header from the size T of the data block requested by the multiplexing/demultiplexing controller 140.

When retransmitting the block using the format of FIG. 9A, the RLP controller 131 first sets the SEQ field with the 8 low bits of the block sequence number B_SEQ of the data portion. When retransmitting the block using the format of FIG. 9A, the RLP controller 131 sets the TYPE field to '0' and the REXMIT field to '1', and then fills the DATA field with the retransmission data. The RLP controller 131 uses the format of FIG. 9B when the above conditions are not satisfied.

When retransmitting the data segment in the block using the format of FIG. 9B, the RLP controller 131 first sets the SEQ field with the 8 low bits of the block sequence number B_SEQ of the data portion. Further, the RLP controller 131 sets the SEG field with the D_SEQ value.

When retransmitting the data using the format of FIG. 9B, the RLP controller 131 sets the TYPE field to '1' and the REXMIT field to '1', and then fills the DATA field with the retransmission data.

When retransmitting the data using the format of FIG. 9B, the RLP controller 131 sets the END field to '1' if the following conditions are satisfied, and otherwise, sets the END field to '0'.

First, after transmission, the data segment in the block has no more data which has not yet been retransmitted.

Second, a value determined by adding the number N of the transmitted data bytes to the D_SEQ is not equal to $N_{DATA}$ or a multiple of it.

The RLP controller 131 transmits a null data block to the multiplexing/demultiplexing controller 140, when there is no new data, retransmission data or control frame to be transmitted.

7. SCH Data Receiving Operation of the RLP Controller

The multiplexing/demultiplexing controller 140 provides the RLP controller 131 with the data block together with information about the size T of the received data block.

When it receives a new data frame in the format of FIG. 9A or 9B, the RLP controller 131 uses the 21-bit sequence number register L_V(R) 136. The RLP controller 131 determines the 12 high bits of the 21-bit value from the sequence number register L_V(R) 136 as a block sequence number B_SEQR waiting to be transmitted, and the 9 low bits as a data sequence number D_SEQR waiting to be transmitted. First, the RLP controller 131 calculates the block sequence number B_SEQ using the 8-bit SEQ field of the received frame and the L_V(R) register 136, in accordance with Equation 2.

The RLP controller 131 determines the data sequence number D_SEQ of the first data byte in the received data segment as '0', upon receipt of the new data frame in the format of FIG. 9A. The RLP controller 131 sets the END field which is the block end indicator to '1', upon receipt of the new data frame in the format of FIG. 9A.

Upon receipt of the new data frame in the format of FIG. 9B, the RLP controller 131 determines the data sequence number D_SEQ of the first data byte in the received data segment as the 9-bit SEG field value of the received frame. The RLP controller 131 determines the END field value as a 1-bit END field value of the received frame, upon receipt of the new data frame in the format of FIG. 9B.

Upon receipt of the retransmitted data frame in the format of FIG. 9A or 9B, the RLP controller 131 should have the NAK list 137, as in the fundamental channel. The RLP controller 131 detects a NAK entry where the 8 low bits of the 12-bit block sequence number value are consistent with a value filled in the 8-bit SEQ field of the received retransmitted frame. If there is a detected NAK entry, the RLP controller 131 determines the block sequence number B_SEQ stored in the NAK entry as a block sequence number of the received data segment. Otherwise, if there is no detected NAK entry, the RLP controller 131 discards the received frame.

Upon receipt of the retransmitted data frame in the format of FIG. 9A, the RLP controller 131 determines the data sequence number D_SEQ of the first data byte in the received data segment as '0'. The RLP controller 131 determines the END field value as '1', upon receipt of the retransmitted data frame in the format of FIG. 9A.

Upon receipt of the retransmitted data frame in the format of FIG. 9B, the RLP controller 131 determines the data sequence number D_SEQ of the first data byte in the received data segment as a 9-bit SEG field value of the received frame. Upon receipt of the retransmitted data frame in the format of FIG. 9B, the RLP controller 131 determines the END field value as a 1-bit END field value of the received frame.

Upon receipt of the formats shown in FIG. 9A or 9B, the RLP controller 131 sets the data sequence number of the first data byte in the received data segment to the D_SEQ field value determined in the above process. After determining the block sequence number B_SEQ and the data sequence number D_SEQ of the first data byte in the received data segment, the RLP controller 131 calculates the sequence numbers of the remaining data bytes using Equation 1.

The RLP controller 131 uses the L_V(N) register 135 which is a 21-bit sequence number register when processing the data bytes in the received data segment. The RLP controller 131 determines the 12 high bits of the 21-bit value from the sequence number register L_V(N) 135 as a block sequence number B SEQN waiting to be retransmitted, and determines the 9 low bits as a data sequence number D_SEQN waiting to be retransmitted. The RLP controller 131 decides the block sequence numbers and the data sequence numbers of the respective data bytes in the received data segment, based on Table 17.

The RLP controller 131 compares a pair <B,D> of the block sequence number and the data sequence number of each data byte in the received data segment with <B_SEQR, D_SEQR> and <R_SEQN, D_SEQN> using Table 17, as follows.

First, if <B,D> is equal to or larger than <B_SEQN, D_SEQN> and is smaller than <B_SEQR, D_SEQR>, the RLP controller 131 regards this as retransmitted data.

Second, if <B,D> is equal to or larger than <B_SEQR, D_SEQR> and a B value is smaller than a value determined by performing modulo $2^8$ operation on a value determined by adding B_SEQR to the E register 134, the RLP controller 131 regards this as new data.

Third, if <B,D> is equal to or larger than a value determined by performing modulo 28 operation on a value determined by adding <B_SEQR, D_SEQR> to the E register 134, the RLP controller 131 regards this as duplicated data.

The RLP controller 131 discards the data byte regarded as the duplicated data, since it is the previously received data.

If the received data byte is regarded as a new data byte or a retransmitted data byte, the RLP controller 131 performs the following operations.

First, if <B,D> of the received data byte is larger than or equal to <B_SEQN, D_SEQN> and is smaller than <B_SEQR, D_SEQR>, the RLP controller 131 creates a resequencing buffer entry comprised of a block sequence number of the received data byte, a data sequence number of the received data byte, the received data byte, and an indicator indicating whether the received data byte is the last data byte in the block and stores the received data byte in the rearrange buffer 138. The indicator indicating whether the received data byte is the last data byte in the block is set to indicate 'LAST', when the data byte is the last data byte of the received data segment and the END value is set to '1'. At this point, if <B,D> is equal to <B_SEQN, D_SEQN>, the RLP controller 131 sequentially transmits to the reception data buffer the stored data bytes from the resequencing buffer entry having a sequence number <B_SEQ, D_SEQN> to the resequencing buffer entry having a sequence number which can be consecutively transmitted, out of the resequencing buffer entries stored in the rearrange buffer 138. If the indicator indicating whether a data byte of a resequencing buffer entry, to which the last transmitted data byte belongs, is the last data byte of a block is set to a value indicating the last byte, the RLP controller 131 sets the 12 high bits of the L_V(N) register 135 to the next block sequence number of the block sequence number stored in the resequencing buffer entry and sets the 9 low bits to '0'. Otherwise, if the indicator is not set to indicate the last byte, the RLP controller 131 sets <B_SEQN, D_SEQN> to indicate the next data byte of the last transmitted data byte using Table 1, and then sets the 12 high bits and the 9 low bits of the L_V(N) register 135 to the B_SEQN value and the D_SEQN value, respectively. The RLP controller 131 records the fact that the awaited data frame is received at the NAK entry having the same block sequence number and data sequence number as those of the received data byte.

Second, if <B,D> of the received data byte is equal to <B_SEQR, D_SEQR> and <B_SEQR, D_SEQR> is equal to <B_SEQN, D_SEQN>, the RLP controller 131 increases both <B_SEQR, D_SEQR> and <B_SEQN, D_SEQN> to indicate the next byte using Equation 1. At this point, if the data byte is the last data byte of the received data segment and the END value is set to '1', the RLP controller 131 sets the 12 high bits of the L_V(N) register 135 to the next block sequence number of the B SEQN value and the 9 low bits to '0', and similarly, sets the 12 high bits of the L_V(R) register 136 to the next block sequence number of the B_SEQR value and the 9 low bits to '0'. Otherwise, the RLP controller 131 sets the 12 high bits and the 9 low bits of the L_V(N) register 135 to the B_SEQN value and the D_SEQB value, respectively, and sets the 12 high bits and the 9 low bits of the L_V(R) register 136 to the B_SEQR value and the D_SEQR value, respectively. The RLP controller 131 provides the received data byte to the reception data buffer.

Third, if <B,D> of the received data byte is equal to <B_SEQR, D_SEQR> and <B_SEQR, D_SEQR> is not equal to <B_SEQN, D_SEQN>, the RLP controller 131 increases <B_SEQR, D_SEQR> to indicate the next byte using Equation 1. At this point, if the data byte is the last data byte of the received data segment and the END value is set to '1', the RLP controller 131 sets the 12 high bits of the L_V(R) register 136 to the next block sequence number of the B_SEQR value and the 9 low bits to '0'. Otherwise, the RLP controller 131 sets the 12 high bits and the 9 low bits of the L_V(R) register 136 to the B_SEQR value and the D_SEQR value, respectively. In this case, the RLP controller 131 creates the received data byte into the resequencing buffer entry comprised of a block sequence number of the received data byte, a data sequence number of the received data byte, the received data byte, and an indicator indicating whether the received data byte is the last data byte in the block and stores the received data byte in the rearrange buffer 138. The indicator indicating whether the received data byte is the last data byte in the block is set to indicate 'LAST', when the data byte is the last data byte of the received data segment and the END value is set to '1'.

Fourth, if <B,D> of the received data byte is larger than <B_SEQR, D_SEQR>, the RLP controller 131 creates an entry for each data byte in the NAK list 137, in order to request retransmission of the data bytes of <B_SEQR, D_SEQR> to the previous data byte of <B,D>. As stated above, each entry is comprised of a block sequence number of the missing data byte, a data sequence number of the missing data byte, an indicator indicating whether the missing data byte is received, a retransmit timer and an abort timer. Further, the RLP controller 131 stores the received data byte in the rearrange buffer 138, and increases <B_SEQR, D_SEQR> to indicate the next data byte using Equation 1. If the data byte is the last data byte of the received data segment and the END value is set to '1', the RLP controller 131 sets the 12 high bits of the L_V(R) register 136 to the next block sequence number of the B_SEQR value and sets the 9 low bits to '0'. Otherwise, the RLP controller 131 sets the 12 high bits and the 9 low bits of the L_V(R) register 136 to the B_SEQR value and the D_SEQR value, respectively.

If it is informed by the multiplexing/demultiplexing controller that a damaged data block is received, the RLP controller 131 increases the value stored in the E register 134 by one and stores the resulting value in the E register 134. If a value determined by performing modulo $2^{12}$ operation on a value determined by adding the increased value of the E register 134 to the B_SEQR value is larger than the B_SEQN value, the RLP controller 131 performs the reestablish process.

If there is any data block which is received correctly and is not a null data block or if it is informed by the multiplexing/demultiplexing controller that no frame is received, the RLP controller 131 sets the E register 134 to '0'.

8. Operation of RLP Controller after Data Receiving

After processing all the received frames, the RLP controller 131 performs the following operation. When the received data block includes a new data frame or no frame is received from the RLP controller of the receiving side, the RLP controller 131 performs the following processes on the NAK entries in the NAK list 137 in the order of the older entries.

First, if an abort timer has not expired yet and the sequence number, included in the NAK entry, has been transmitted three times, the RLP controller 131 decreases the abort timer value by one. If the abort timer value becomes '0', the RLP controller 131 performs the following operation. If the RLP controller 131 has received the retransmitted data byte corresponding to the sequence number that the NAK entry already has, the RLP controller 131 deletes the NAK entry. Otherwise, if the RLP controller 131 has not received the retransmitted data byte corresponding to the sequence number that the NAK entry already has, the RLP controller 131 sequentially transmits the received data bytes which are larger than the block sequence number and the data sequence number of the NAK list stored in the rearrange buffer 138 and can be successively transmitted to the upper link protocol, considering that the data byte corresponding to the sequence number of the NAK entry is not received. Then, the RLP controller 131 deletes the NAK entry. The RLP controller 131 sets L__V(N) register 135 to the sequence number of the data byte to be received next.

Second, if the abort timer has not expired yet and the sequence number, that the NAK entry has, was included in the NAK which has already transmitted two times, the RLP controller 131 decreases the abort timer value by one. If the abort timer value becomes '0', the RLP controller 131 performs the following operation. If the RLP controller 131 has received the retransmitted data byte corresponding to the sequence number that the NAK entry already has, the RLP controller 131 deletes the NAK entry and sets the L__V(N) register 135 to the sequence number of the data frame to be received next. Otherwise, if the RLP controller 131 has failed to receive the data byte, the RLP controller 131 sets the abort timer of the NAK entry to a proper value. The RLP controller 131 includes the block sequence number and the data sequence number of the NAK entry in the three NAK frames to be transmitted next.

The RLP controller 131 sets the retransmit timer to a proper value for the NAK entries which should be newly added, and includes the sequence numbers of the NAK entry in the two NAK frames to be transmitted next.

As described above, the novel mobile communication system transmits and receives an RLP frame, using a block sequence number indicating a consecutive block for a service included in the RLP frame and a data sequence number indicating a sub-consecutive block of the consecutive block. It is possible to effectively transmit or retransmit the increased number of data bytes for multiple services, by using the block sequence number and the data sequence number by two-dimensional addressing.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting data in a mobile communication system, comprising the steps of:
   segmenting a data stream into at least one consecutive frame having a variable data length, the data stream being segmented into a plurality of consecutive blocks having a variable data length, each said consecutive block being segmented into a plurality of sub-consecutive blocks having a byte length;
   attaching, at each head of the consecutive frames, a header including a first set of bits indicating a sequence number of a consecutive block, a second set of bits indicating a sequence number of a sub-consecutive block and an indicator indicating whether the last sub-consecutive block included in each consecutive block is included; and
   transmitting the header-attached consecutive frames, wherein the size of each consecutive block included in each consecutive frame is less than a predetermined size.

2. The method as claimed in claim 1, wherein the size of each consecutive block included in each consecutive frame is determined to a requested size.

3. The method as claimed in claim 1, wherein the size of each consecutive block included in each consecutive frame is identical to each other.

4. A device for transmitting data in a mobile communication system, comprising:
   a data buffer for storing a data stream to be transmitted, the data stream being segmented into a plurality of consecutive blocks, each of said blocks being segmented again into a plurality of sub-consecutive blocks having a byte length;
   a register for storing block sequence numbers for the consecutive blocks and data sequence numbers for the sub-consecutive blocks;
   a controller for attaching a header of a radio link protocol (RLP) frame, and transmitting the header-attached RLP frame which includes a block sequence number indicating the sequence number of the consecutive block, a data sequence number indicating the sequence number of the sub-consecutive block and an indicator indicating whether the last sub-consecutive block of the consecutive block is included wherein the size of each consecutive block included in the corresponding RLP frame is less than a predetermined size.

5. The device as claimed in claim 4, further comprising a forward resequencing buffer for storing the transmitted RLP frame in order to retransmit the transmitted RLP frame.

6. The device as claimed in claim 4, wherein the size of each consecutive block included in each consecutive frame is determined to a requested size.

7. The device as claimed in claim 4, wherein the size of each consecutive block included in each consecutive frame is identical to each other.

* * * * *